United States Patent [19]
Carroll et al.

[11] Patent Number: 5,517,194
[45] Date of Patent: May 14, 1996

[54] PASSIVE RF TRANSPONDER AND METHOD

[75] Inventors: Gary T. Carroll, Boulder; J. Donald Pauley, Estes Park, both of Colo.

[73] Assignee: Racom Systems, Inc., Englewood, Colo.

[21] Appl. No.: 194,616

[22] Filed: Feb. 10, 1994

[51] Int. Cl.$^6$ ................................................. G01S 13/74
[52] U.S. Cl. ........................... 342/50; 342/42; 340/825.54
[58] Field of Search ................................. 342/42, 50, 51, 342/44; 340/825.54, 825.69

[56] References Cited

U.S. PATENT DOCUMENTS

| | | | |
|---|---|---|---|
| 3,713,148 | 1/1973 | Cardullo et al. | 342/42 |
| 4,926,187 | 5/1990 | Sugawara et al. | 342/44 |
| 5,374,930 | 12/1994 | Schuermann et al. | 342/42 |
| 5,430,447 | 7/1995 | Meier | 342/51 |

OTHER PUBLICATIONS

Ramtron Corporation, R2 92490, Ramtron Brochure, RTx 0801 Ramtag™, 256–Bit Passive Nonvolatile RF/ID Tag Engineering Prototype, 1990, pp. 1–6.

Ramtron International Corporation, Ramtron Brochure, FM1208S FRAM®Memory, 4,096–Bit Nonvolatile Ferroelectric RAM Product Specification, R3 Aug., 1993, pp. 1–8.

*Primary Examiner*—Ian J. Lobo
*Attorney, Agent, or Firm*—William J. Kubida; Holland & Hart

[57] ABSTRACT

A passive RF transponder incorporating a non-volatile memory element is powered by inductive coupling to a proximately located RF controller. A communication system and method is disclosed which utilizes the controller to send data and commands to the transponder by means of an FSK modulated RF signal in order to cause the transponder to either read selected data from, or write selected data to, the non-volatile memory and transmit the same back to the controller utilizing PSK modulation. The communication system and method may be operated in either full duplex or half duplex modes of operation with the controller causing the transponder to simultaneously write data to its non-volatile memory array as the contents are read out and transmitted to the controller by complementing selected bits thereof.

73 Claims, 13 Drawing Sheets

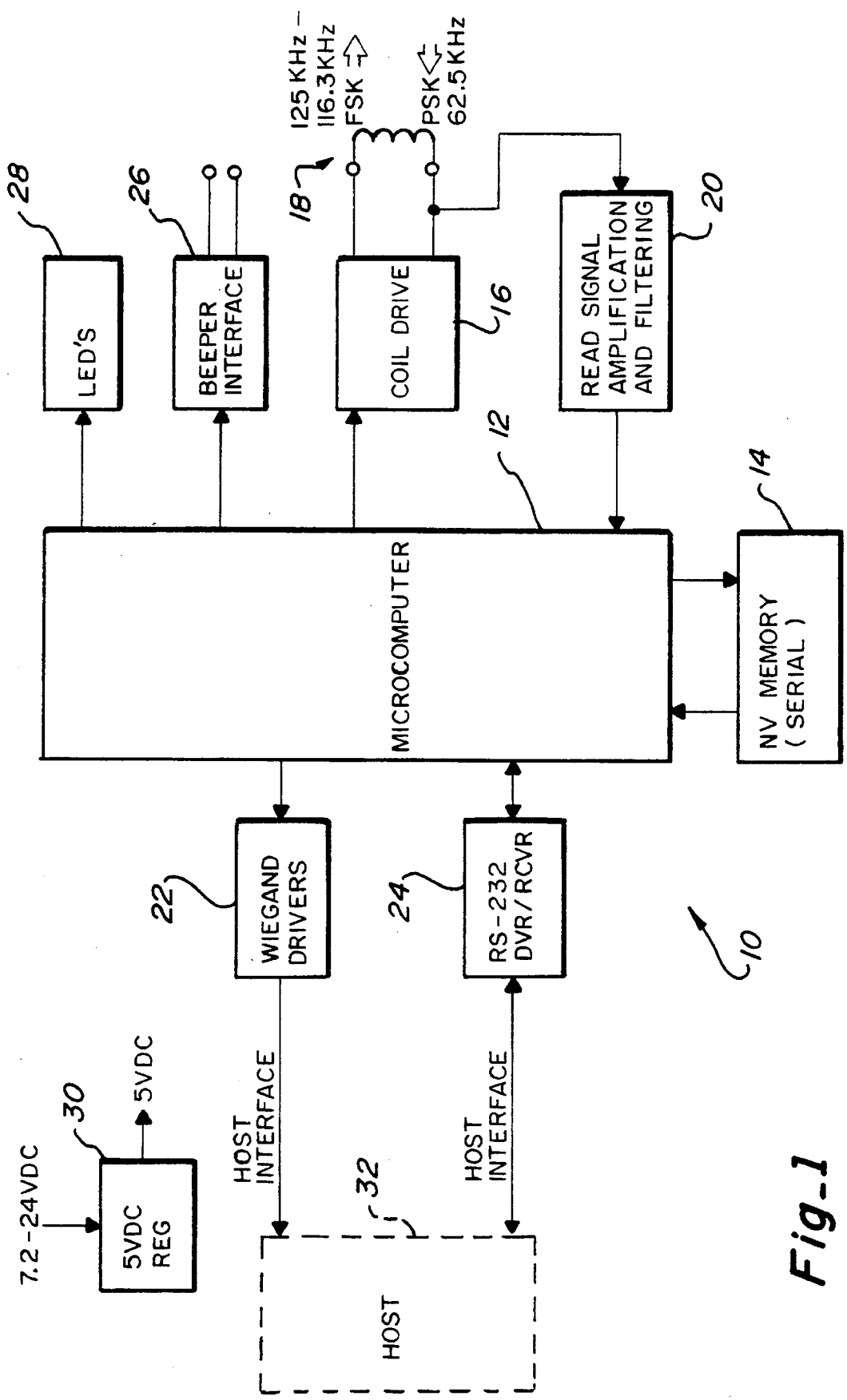
Fig._1

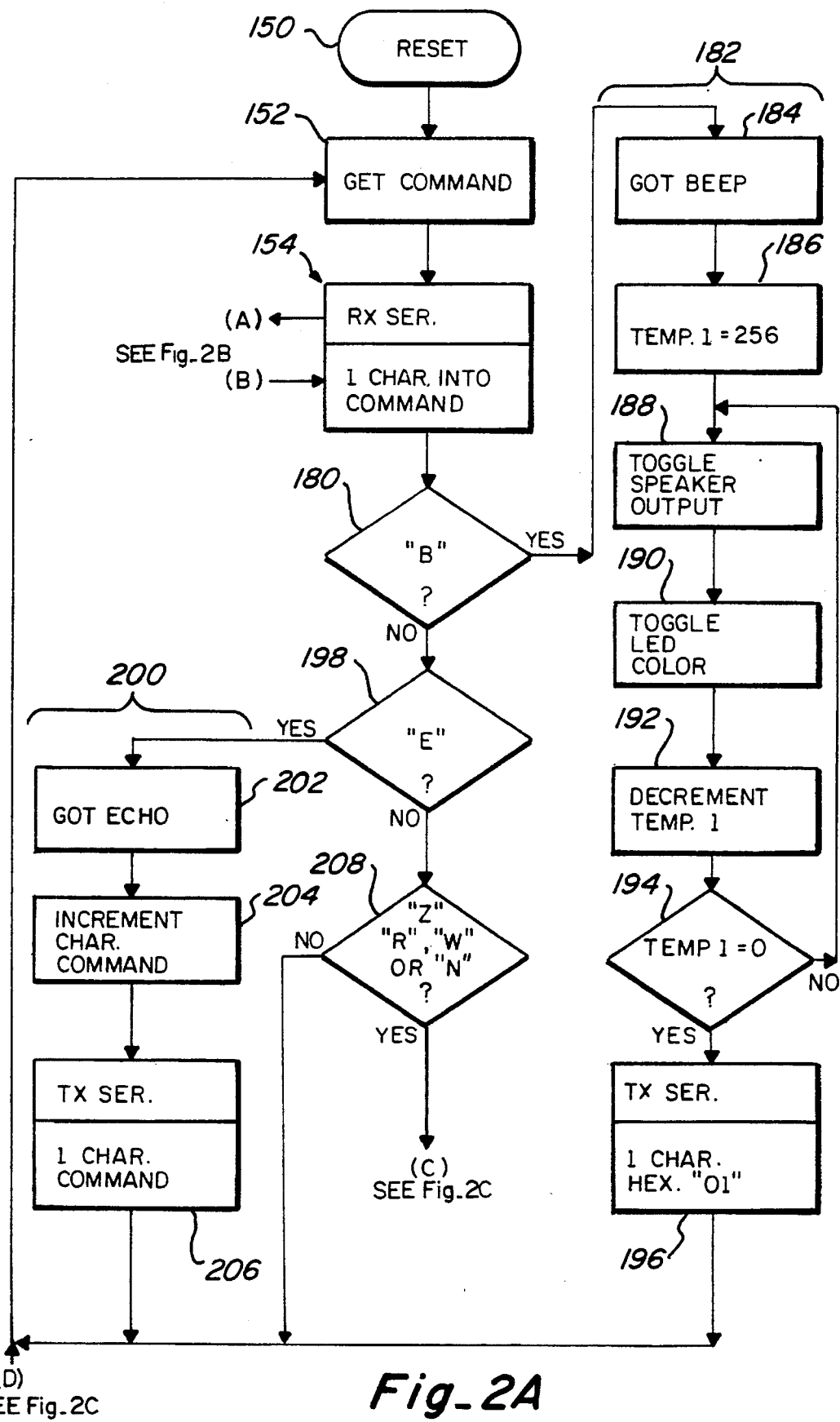
Fig_2A

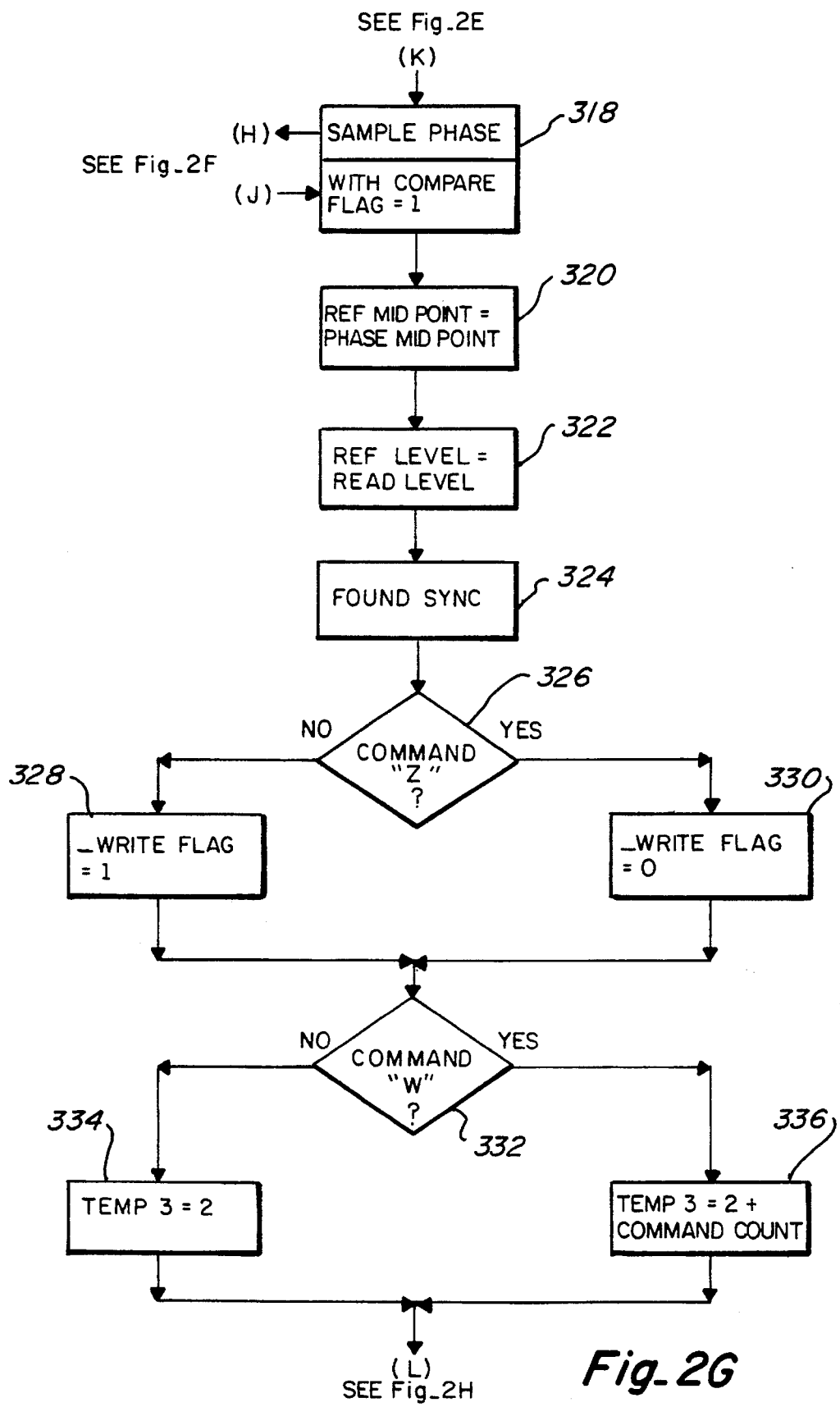

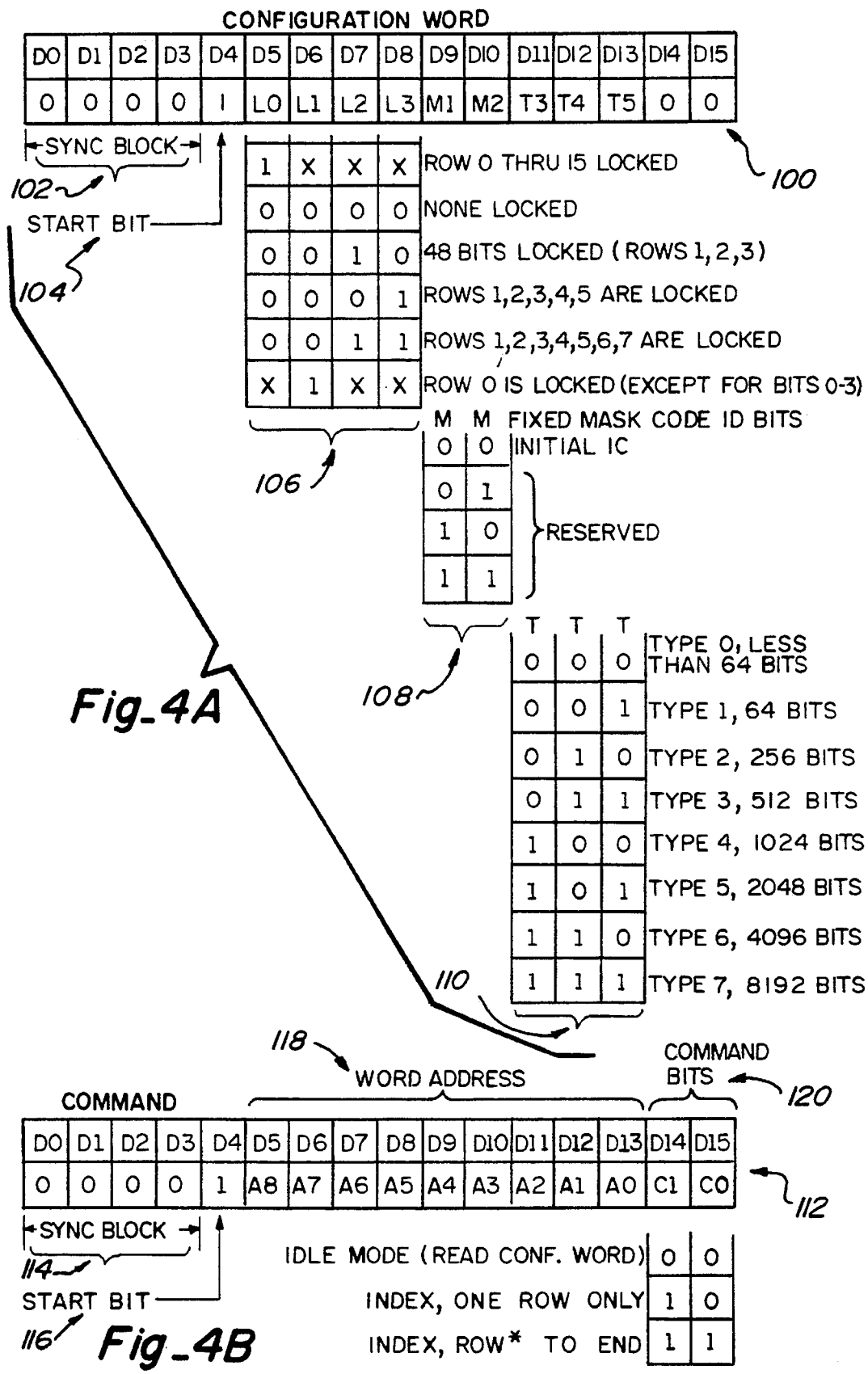

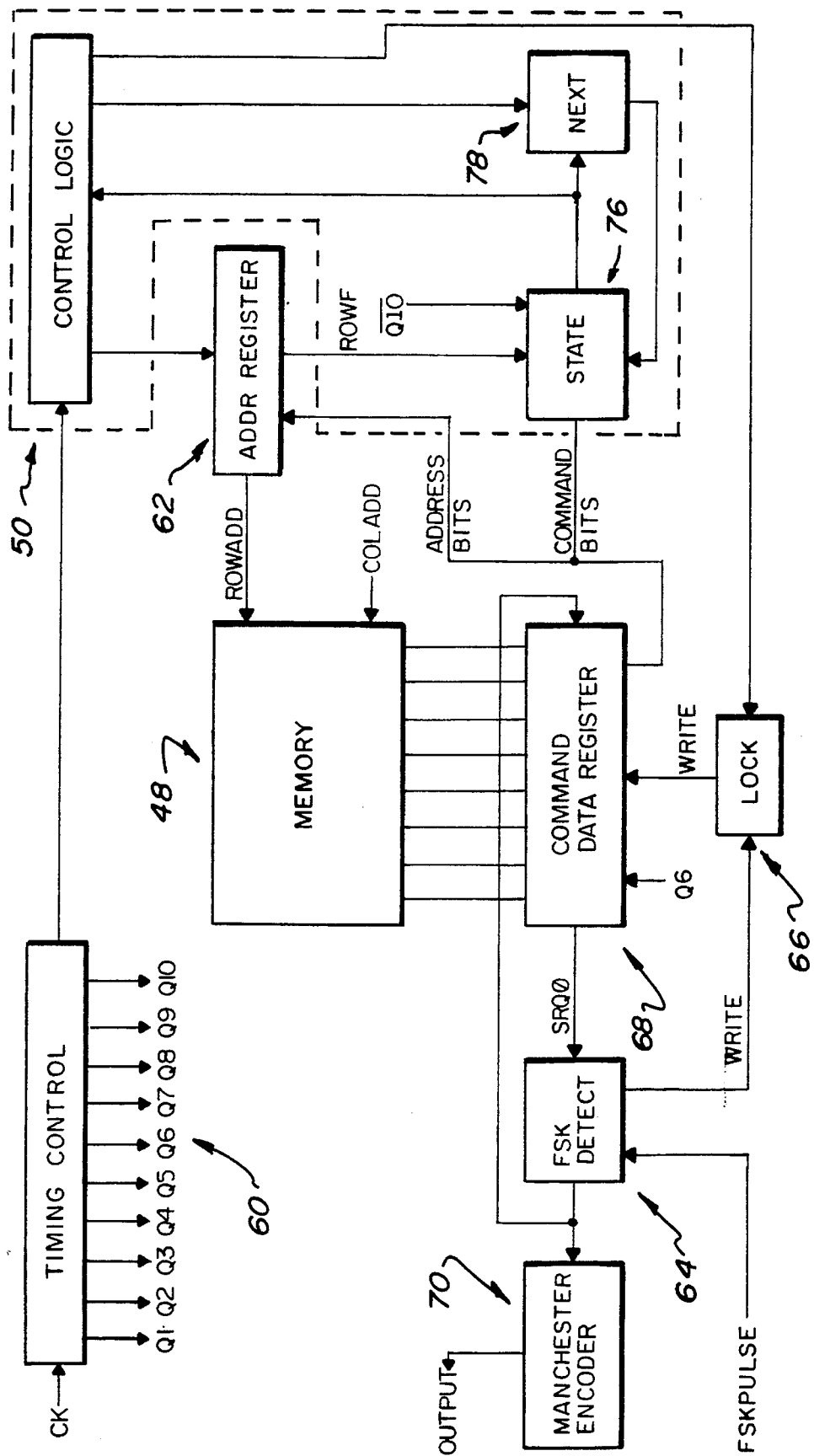
Fig_5

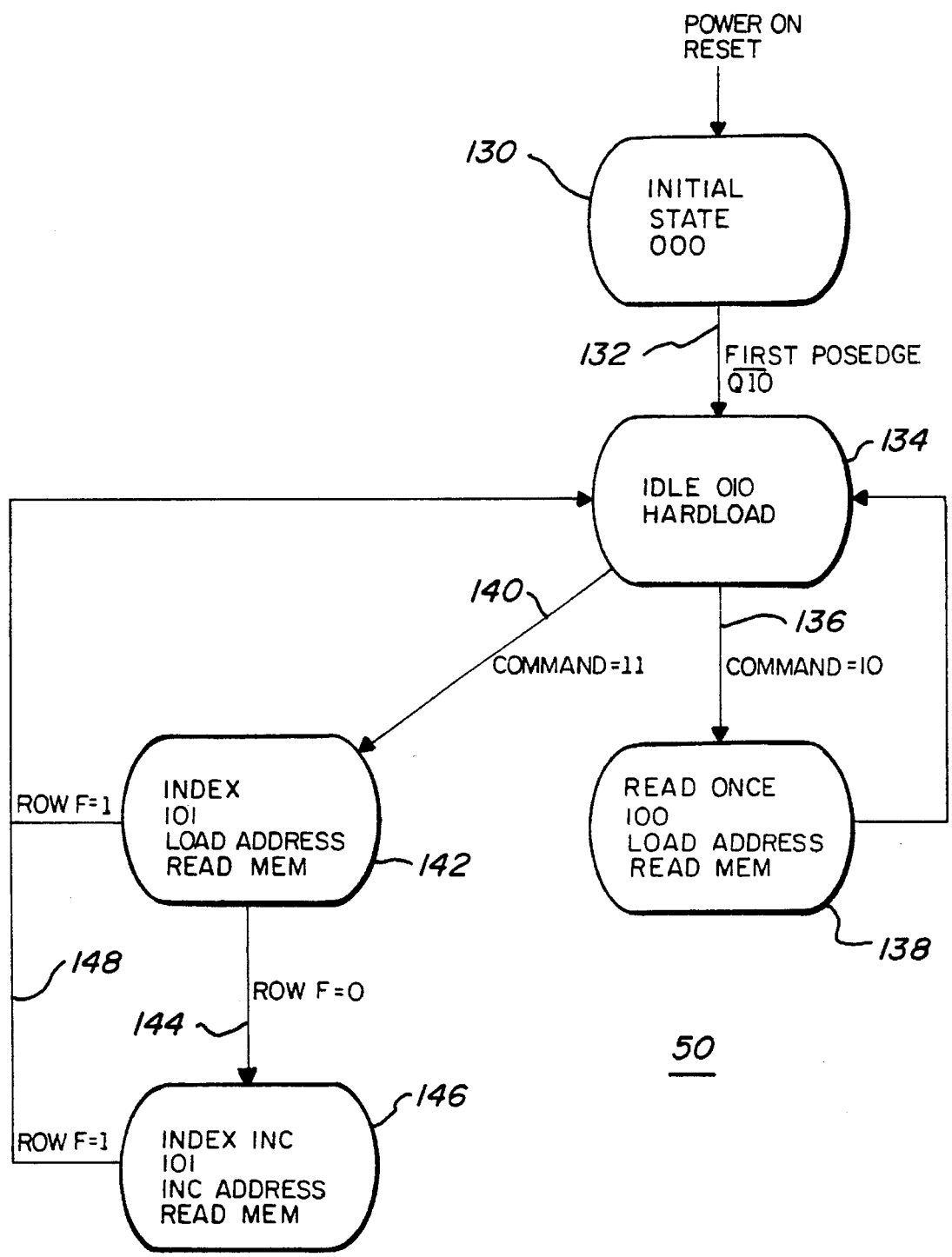
Fig_6

PASSIVE RF TRANSPONDER AND METHOD

CROSS REFERENCE TO RELATED APPLICATIONS

The present invention is related to those described in U.S. patent application Ser. No. 08/194,694 for "INTEGRATED ASYNCHRONOUS FSK DETECTOR AND METHOD"; Ser. No. 08/194,723 for "COMMUNICATIONS SYSTEM UTILIZING FSK/PSK MODULATION TECHNIQUES"; Ser. No. 08/194,718 for "FSK DETECTOR CIRCUIT AND METHOD"; Ser. No. 08/195,162 for "LOW POWER CONSUMPTION OSCILLATOR USING MULTIPLE TRANSCONDUCTANCE AMPLIFIERS"; and Ser. No. 08/194,707 for "POWER SUPPLY AND POWER ENABLE CIRCUIT FOR AN RF/ID TRANSPONDER", filed concurrently herewith and assigned to the assignee of the present invention, the disclosures of which are hereby specifically incorporated by this reference.

BACKGROUND OF THE INVENTION

The present invention relates, in general, to the field of radio frequency ("RF") identification ("ID") systems. More particularly, the present invention relates to a passive RF transponder incorporating a non-volatile memory element which is powered by inductive coupling to a proximately located RF controller. A communication system and method utilizes the controller to frequency shift key ("FSK") the powering RF signal to cause the transponder to either read data from or write data to the non-volatile memory and transmit the same back to the controller utilizing phase shift keying ("PSK") modulation in response to commands from the controller. The communication system may operate in either full duplex or half duplex modes with the controller causing the transponder to simultaneously write data to its non-volatile memory array as the contents are read out and transmitted to the controller by complementing selected bits thereof.

Many potential applications exist for RF/ID devices or cards that may be readily carried by a user and have their memory contents read when placed near a reader/controller. A still greater number of applications can be found for a true card sized RF transponder to which data may be written as well.

As a practical matter, the card form factor generally precludes the use of a continuous on-board power source such as a battery, which in turn eliminates the possibility of data retention through the use of conventional volatile semiconductor storage devices such as dynamic random access memory ("DRAM") or battery backup static random access memory ("BBSRAM"). Furthermore, the write times and power requirements for conventional non-volatile memories such as electrically erasable programmable read only memory ("EEPROM") and non-volatile random access memory ("NOVRAM") render their use in a passive transponder extremely problematic if not unworkable.

An alternative non-volatile memory technology for retention of data in a passive RF transponder includes the use of a ferroelectric random access memory ("FRAM®") integrated circuit memory array utilizing a proprietary lead-zirconate-titanate ("PZT") ceramic thin film available from Ramtron International Corporation, Colorado Springs, Colo. Through the use of FRAM technology, it is possible to obtain sufficient power to write to the memory array and power associated logic from a relatively weak external RF field. A proposed RF/ID tag utilizing FRAM technology is described in the literature relating to the "RTx 0801 Ramtag"© 1990 Ramtron Corporation. The engineering prototype therein described, postulated a passive RF/ID tag which could be powered in an FSK modulated RF field varying between 500 KHz (logic one) and 400 KHz (logic zero). The tag itself was designed to power up in a "read" mode and respond to the powering "reader" also using an FSK modulated signal of 50 KHz (logic one) and 40 KHz (logic zero). As a proposed communications protocol, it was suggested that there be a synchronization ("SYNC") field of 1.5 bit time of logic one followed by 1.5 bit time of logic zero thereafter followed by one of four possible commands: 00 for "read"; 01 for "write" enable; 10 for "write" and 11 for "write" disable. As previously described, the tag was initialized upon power up in a "read" mode of operation and did not identify itself to the reader as to its pre-programmed identity or configuration. In addition, through the proposed use of separate write enable and disable commands, a less than efficient communications protocol is defined that does not accord full duplex operation. The card and reader, as proposed, could also only read or write the entire memory contents at one time and could not address selected words or rows of memory.

SUMMARY OF THE INVENTION

Disclosed herein is a passive RF transponder and communication system that utilizes FSK modulated RF signals transmitted from the controller to the transponder from which the latter derives its power. The use of FSK modulation allows the average signal power to remain at a maximum as opposed to other modulation techniques such as amplitude shift keying ("ASK") or pulse modulation techniques and the transponder is able to demodulate the FSK encoded signal without the incorporation of an on-chip oscillator frequency reference. In a particular embodiment described, a controller modulates a data signal between 125 KHz and 116.3 KHz to send a four bit time synchronization block, a start bit, memory address and command bits to cause the transponder to read only the word at such address or the entire contents of the memory beginning at such address.

The transponder, upon power up, continuously transmits a configuration word to the controller utilizing a coherent PSK modulated signal of 62.5 KHz derived from the 125 KHz FSK RF input. Utilizing the combination of FSK and PSK modulation techniques, in conjunction with a ferroelectric memory array, allows the transponder "write" range to be the same as the "read" range and precludes interference between read and write commands or other transponders which may be within the RF signal range of the controller. In a particular embodiment, the transponder configuration word includes a sync block and start bit corresponding with the controller command word as well as a number of bits designating the memory words which have been previously "locked" from further writes by the controller. A number of "hard-wired" mask bits and type bits are utilized to identify a particular transponder to the controller and distinguish it from others.

The transponder and communication system disclosed may be operated in either half duplex or full duplex mode. In the former instance, the transponder will transmit the requested words from memory in response to a "read" command beginning at the words specified in the word address portion of the command word. Utilizing the protocol disclosed, the controller must first know the contents of the transponder memory before initiating a "write," which operation is effectuated by sending a burst of 116.3 KHz RF power in synchronization with each bit read out of the transponder memory that it is desired to complement. Typically, the controller will then initiate another "read" of the relevant portions of the transponder memory to verify that the write operation has been properly effectuated.

Alternatively, the communication system of the present invention and transponder may be operated in full duplex mode whereby the read/write/verify operations are effectuated in a single pass operation. In this mode, the controller will complement the selected bits of the memory words as they are read out by the transponder and verify that the data was written properly during each single bit time.

Broadly, disclosed is a communication system which comprises a controller for transmitting an FSK encoded signal to the transponder and for receiving a PSK encoded data signal therefrom. A transponder includes a non-volatile memory array for storing data information, the transponder receiving the FSK encoded signal and transmitting the PSK encoded data signal corresponding to the stored data information to the controller in response thereto.

Also provided is a method for writing data to a transponder from a controller located remotely therefrom which comprises the steps of transmitting a first RF signal from the controller to the transponder, the first RF signal being FSK modulated with a digital data signal. The first RF signal is received at the transponder and it is demodulated to derive the digital data signal. Selected data information stored in the transponder is retrieved in response to the demodulated digital data signal and a second RF signal is transmitted from the transponder to the controller with the second RF signal being PSK modulated with the data information.

In accordance with another method of the present invention, a method for communications between an active RF controller and an associated passive RF transponder comprises the steps of transmitting a first RF signal from the controller to a predetermined radius therefrom. The first RF signal is FSK modulated with a digital data signal. The transponder is placed within the predetermined radius from the controller and receives a first RF signal thereat. A power source for the transponder is derived from the received first RF signal and configuration information stored in the transponder is read and transmitted as a second RF signal which is PSK modulated with the configuration information.

Also disclosed is an RF transponder having an antenna for reception of a FSK modulated RF signal and transmission of a PSK modulated RF signal which comprises a detector circuit coupled to the antenna for demodulating the FSK modulated RF signal and producing a digital data signal corresponding thereto. A control logic circuit controls the transponder functions and a non-volatile memory array is responsive to the control logic circuit and the digital data signal for reading data from or writing data to the memory array. A data encoder circuit is coupled to the memory array for encoding the data read from the memory array and a modulator circuit is coupled to the data encoder circuit and the antenna for modulating an RF signal in accordance with the encoded data to produce the PSK modulated RF signal. In a preferred embodiment, a power supply is coupled to the antenna for deriving a power source for the transponder from the FSK modulated RF signal.

In accordance with a more particular embodiment of the present invention a communication system is provided for reading data from and writing data to an RF transponder by means of an RF controller. A microcomputer associated with the controller formulates a first digital message and an antenna drive circuit associated with the controller and controlled by the microcomputer FSK modulates an RF signal by the first digital message to produce an FSK signal. A first antenna is associated with the controller and coupled to the antenna drive circuit for transmitting the FSK modulated RF signal to the transponder. A second antenna is associated with the transponder for receiving the FSK signal and an FSK detector circuit is coupled to the second antenna for detecting the first digital message from the FSK signal. A control logic circuit is also associated with the transponder and is responsive to the first digital message for controlling the transponder functions. A non-volatile memory array associated with the transponder is responsive to the control logic circuit and the FSK detector for selectively reading data from or writing data to the memory array in accordance with the first digital message. A data encoder circuit is coupled to the memory array for generating a second digital message and a PSK modulator is coupled to the data encoder circuit and the second antenna for PSK modulating and transmitting an RF signal to the controller in accordance with the second digital message. A PSK signal data recovery circuit is associated with the controller and is coupled to the first antenna and the microcomputer for decoding the second digital message from the PSK signal and supplying the second digital message to the microcomputer. In a preferred embodiment, the communications system also comprises a power supply associated with the transponder and coupled to the second antenna for deriving a source of power for the transponder from the received FSK signal.

In accordance with another method of the present invention a method for communications between an RF controller and an associated RF transponder comprises the steps of formulating a first digital message at the controller and FSK modulating an RF signal with the first digital message to produce an FSK signal. The FSK signal is transmitted to the transponder from the controller and is received at the transponder where a second digital message is formulated at the transponder in response to the FSK signal. An RF signal is PSK modulated with the second digital message to produce a PSK signal which is transmitted to the controller from the transponder. The PSK signal is received at the controller and the second digital message is detected from the PSK signal. A power source for the transponder may be derived from the received FSK signal when utilized in conjunction with an active RF controller and a passive RF transponder.

Further disclosed herein is a method for data communications between a controller and a transponder. The method includes the steps of repeatedly transmitting a configuration signal from the transponder to the controller, the configuration signal including a first plurality of synchronization data bits. The configuration signal is firstly received and identified at the controller, inclusive of the synchronization data bits. A command signal is synchronously transmitted from the controller to the transponder, the command signal including a second plurality of synchronization data bits coincident with the first plurality of synchronization data bits. The command signal further includes a number of command data bits thereof and is secondly received at the transponder. The command signal, inclusive of the command data bits, is secondly identified at the transponder and a selected portion of a memory array of the transponder is read in response to the command data bits. The transponder alternatively transmits a data signal to the controller, the data signal including a data bit stream representing the selected portion read from the memory array. The data signal, inclusive of the data bit stream, is thirdly received and identified at the controller. In accordance with a more specific method, a complement data signal may be additionally synchronously transmitted from the controller to the transponder, the complement data signal being coincident with the data bit stream of the data signal. Selected portions of the memory array of the transponder are then written in response to the complement data signal.

BRIEF DESCRIPTION OF THE DRAWINGS

The foregoing and other features and objects of the present invention and the manner of attaining them will become more apparent and the invention itself will be best understood by reference to the following description of a preferred embodiment taking in conjunction with the accompanying drawings, wherein:

FIG. 1 is a logic block diagram for an active RF controller for interfacing with a host computer and forming part of the communication system of the present invention for writing data to and reading data from a passive RF transponder by means of a microcomputer controlled coil drive and read channel respectively;

FIGS. 2A–2H comprise a logic flow chart depicting the firmware functionality of the microcomputer utilized in the operation of the controller of FIG. 1;

FIG. 4A is a simplified representation of a configuration word transmitted by the transponder of FIG. 3 when powered by an incoming RF signal from the controller and not being commanded thereby to read and transmit the contents of the on-chip non-volatile memory illustrating the serially transmitted four bit time sync block, one bit time start bit and lock, mask and type bits with ending logic level zero command bits;

FIG. 4B is a simplified representation of a command word transmitted by the controller of FIG. 1 for causing the transponder to read and serially transmit the contents of its on-chip non-volatile memory illustrating the four bit time sync block and one bit time start bit for synchronizing the FSK and PSK transmissions from the controller and transponder respectively, the nine bit non-volatile memory word address and ending two bit time command bits;

FIG. 5 is a further logic block diagram of the transponder of FIG. 3 illustrating in greater detail the control logic thereof; and FIG. 6 is a state diagram illustrating the functionality of the control logic portion of the transponder as shown in FIG. 5 initiated by a power on reset and in response to the command bits of the command word transmitted by the controller shown in FIG. 4b.

DESCRIPTION OF A PREFERRED EMBODIMENT

Figure 2B:
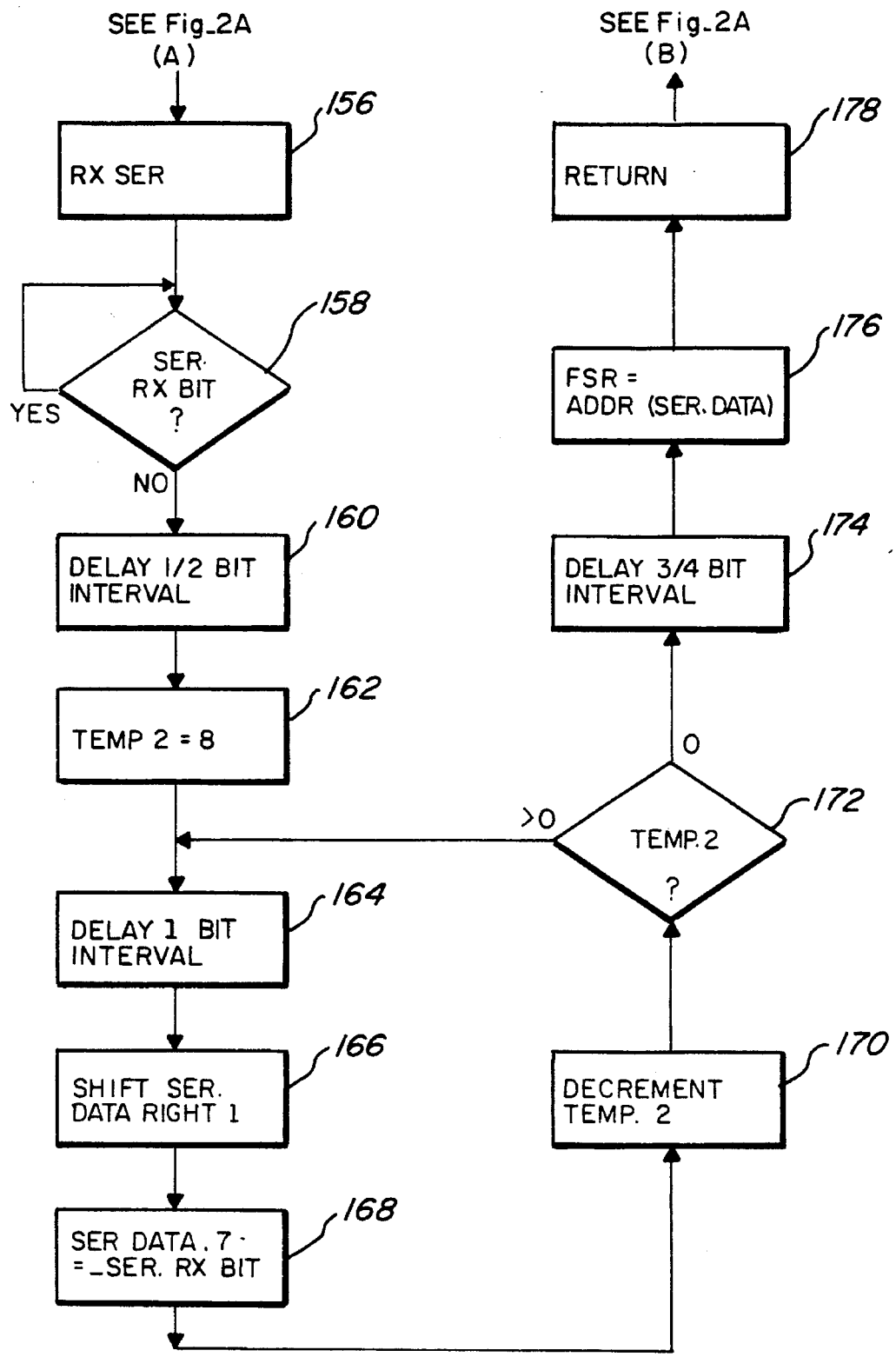
Figure 2C:
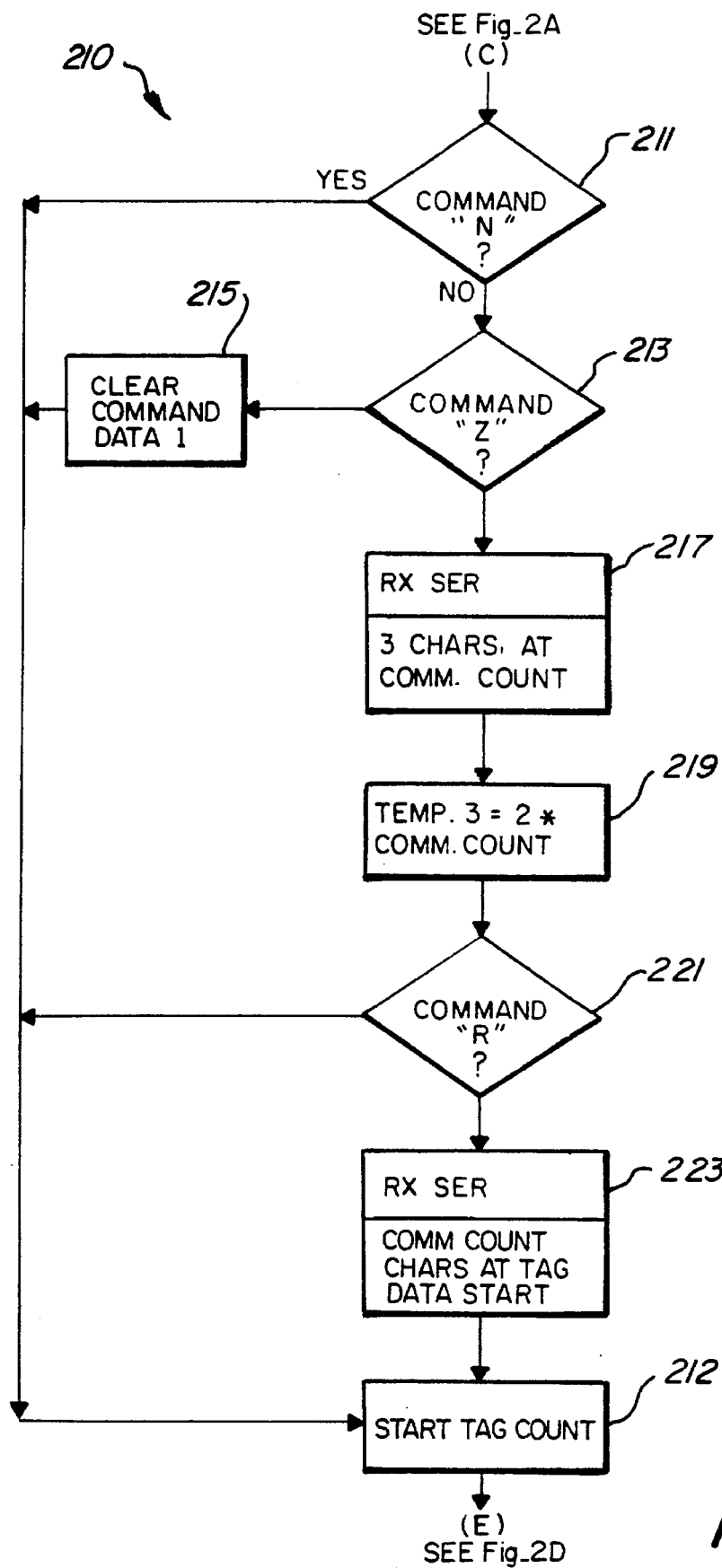
Figure 2D:
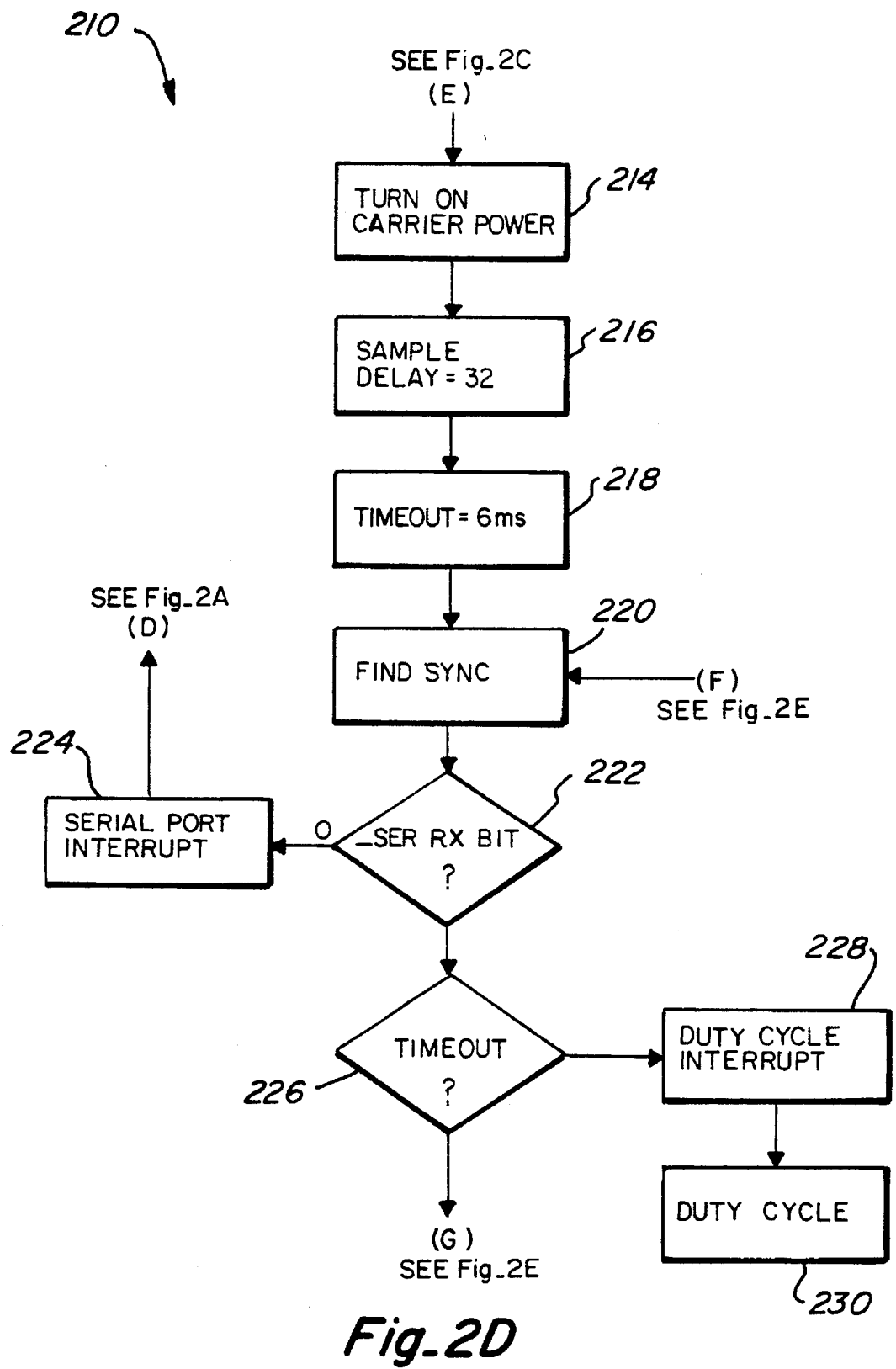
Figure 2E:
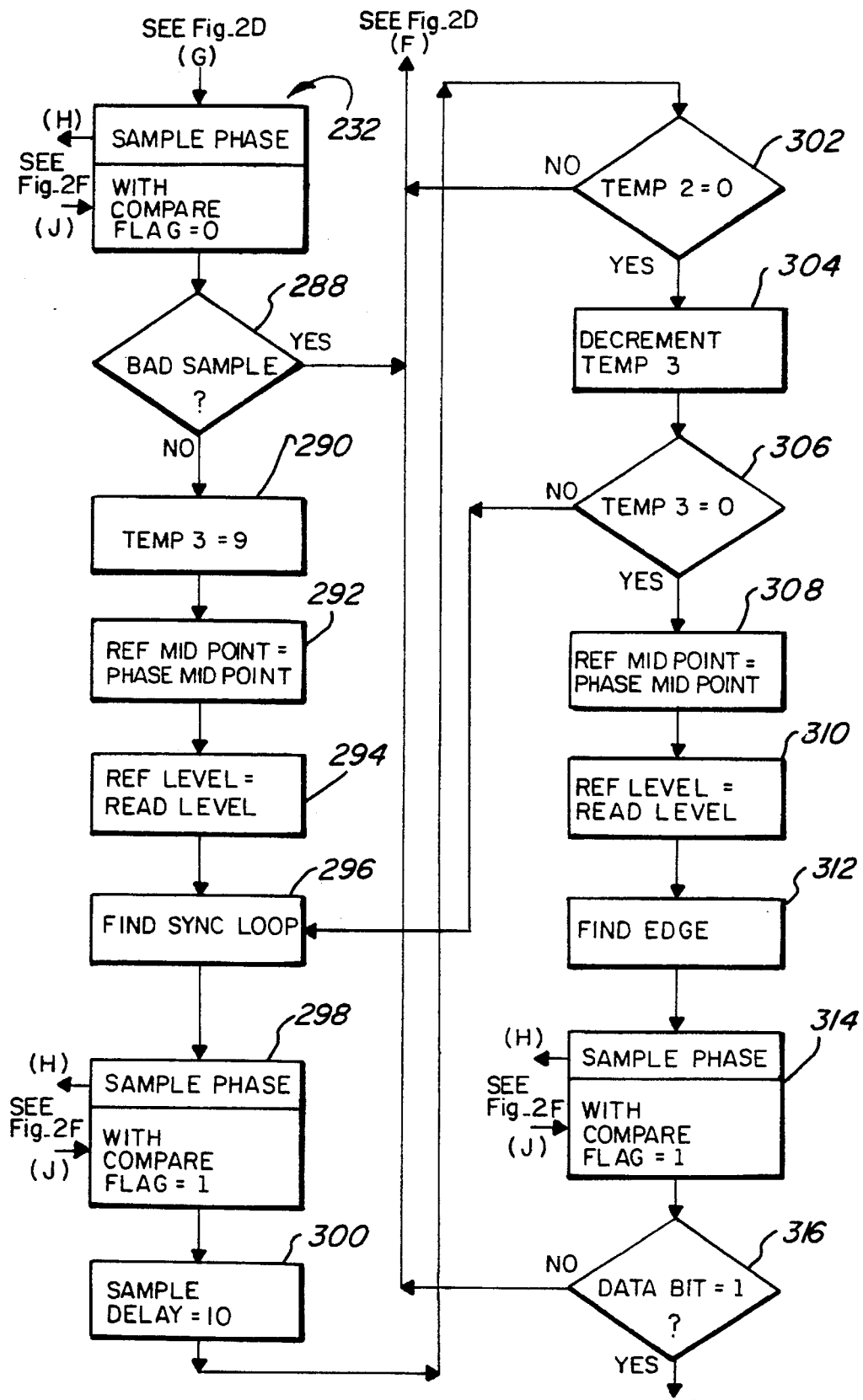
Figure 2F:
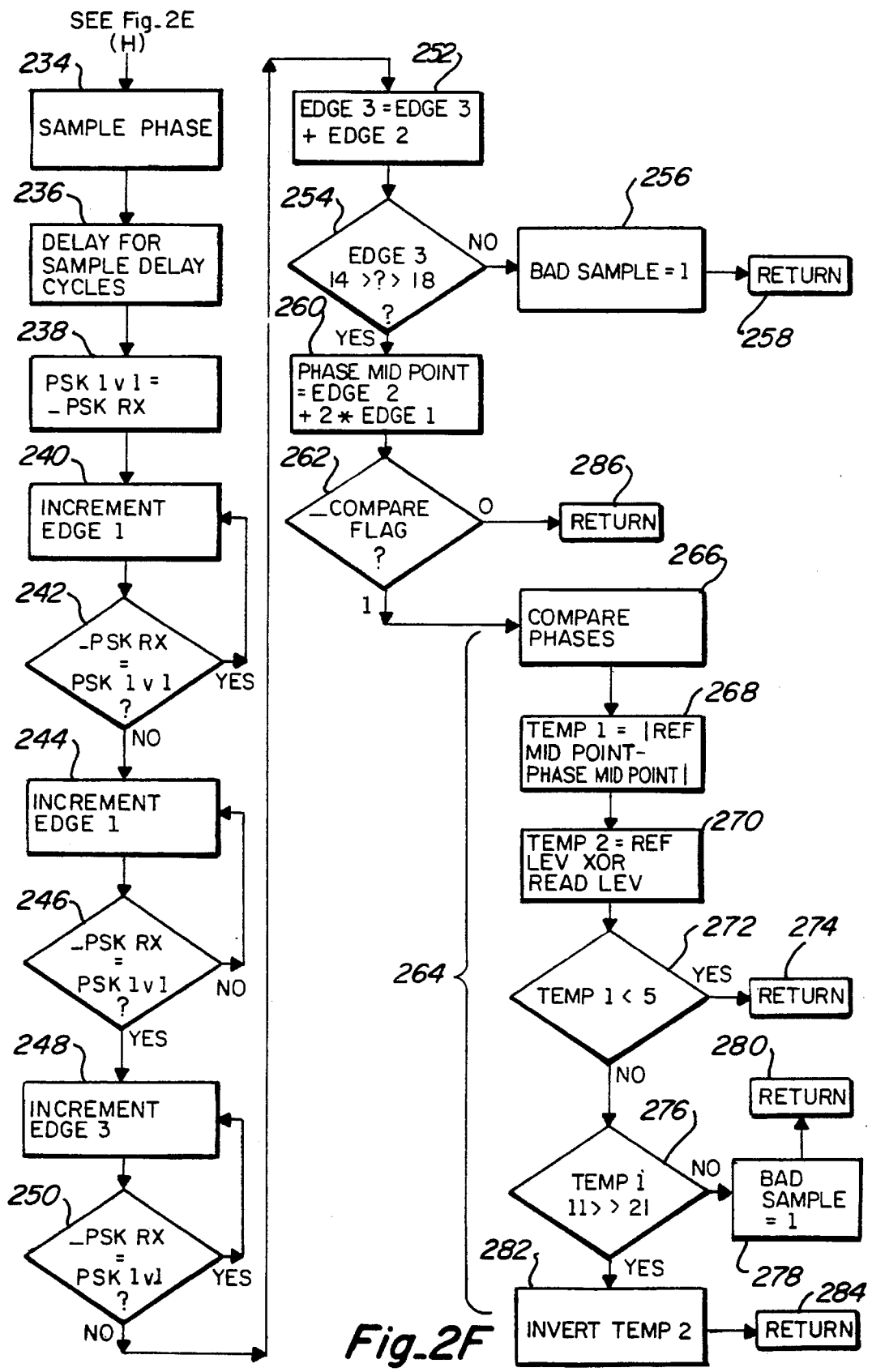
Figure 2H:
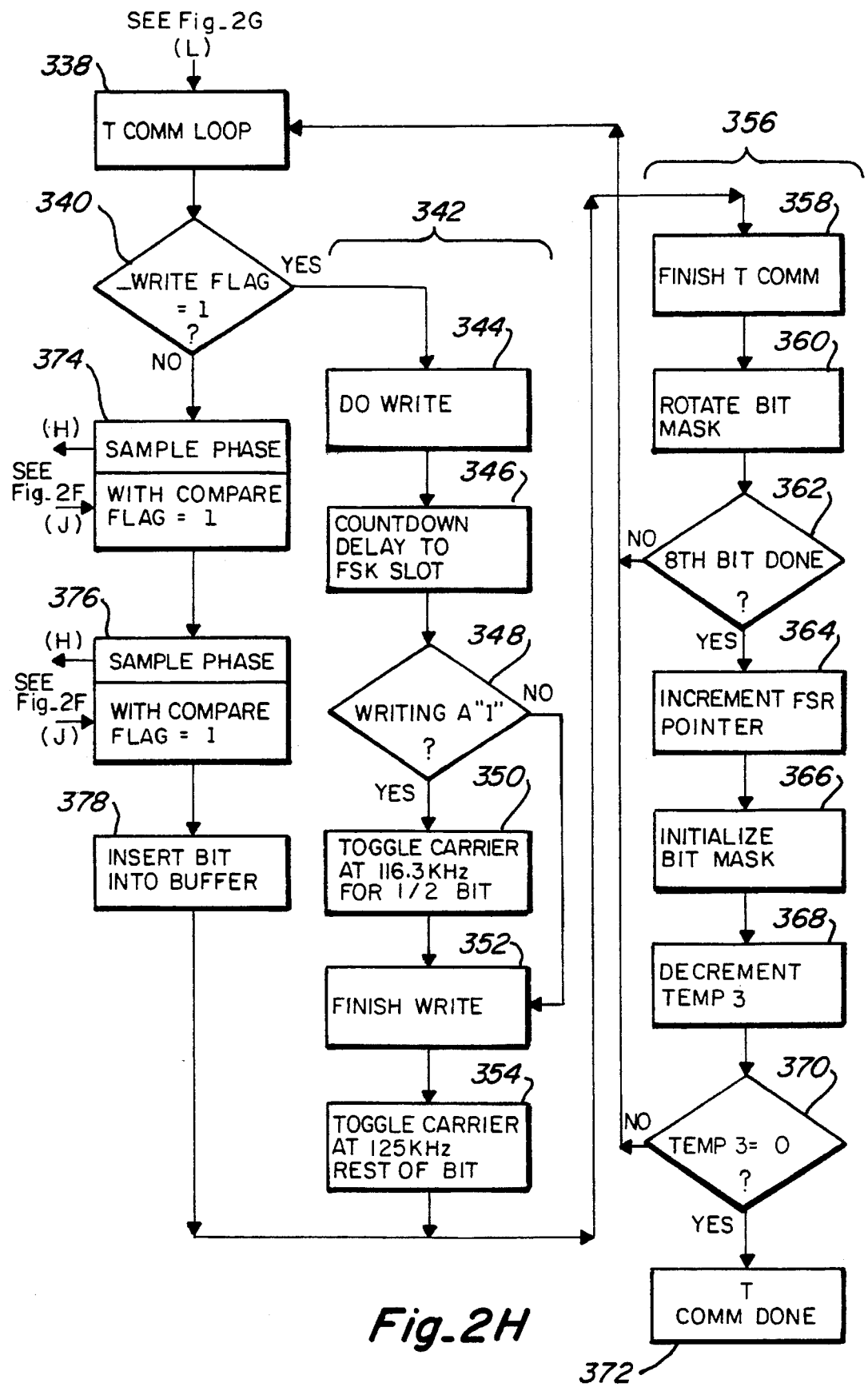

With reference now to FIG. 1, a controller 10 which functions as a transponder reader/writer in the communication system of the present invention is shown. Controller 10 is constructed around a microcomputer 12 which may be any of a number of commercially available devices such as a reduced instruction set computer ("RISC") device such as the PIC16C57HS/P. Microcomputer 12 has an associated non-volatile memory 14, such as an erasable programmable read only memory ("EPROM"), for storing embedded control firmware for the microcomputer 12, the functionality of which will be more fully described hereinafter with respect to FIGS. 2A–2H.

Microcomputer 12 directly drives a coil drive circuit 16 for transmitting FSK modulated data signals to an associated transponder by means of antenna coil 18. The antenna coil 18 which, in a preferred embodiment may be a 580 µH device, is also utilized for reception of PSK modulated data signals from the transponder as will be more fully described hereinafter. Antenna coil 18 is coupled to the input of a read channel 20 which provides signal amplification and filtering of the PSK modulated signal from the transponder. The output of read channel 20 is supplied as input to microcomputer 12.

Microcomputer 12 provides a simple interface to an associated host computer 32 by means of, in a preferred embodiment, either Wiegand drivers 22 or RS-232 interface 24. Wiegand drivers 22 provide a unidirectional interface to a host computer 32 and may be constructed in a conventional manner utilizing field effect transistors ("FET") having parallel connected zener diodes. In a preferred embodiment, the FETs may be supplied as BSS123LT1 devices and the associated zener diodes may be furnished as BZX84C6V8ZX devices, respectively. The standard Wiegand electrical interface is supported including: zero's wire; one's wire and ground. A Wiegand bit stream, of any length, read from a transponder is sent to the host computer 32 via the Wiegand drivers 22.

The RS-232 interface 24 may also be utilized to interface microcomputer 12 of the controller 10 to a host computer 32. In a preferred embodiment, RS-232 interface 24 may be furnished as a MAX233CPP device to provide a close-coupled RS-232 bi-directional interface which is non-error checking and without acknowledgement. The simple RS-232 interface 24 of the controller 10 includes the use of the standard Received Data line and the Transmitted Data line for asynchronous, half duplex data transmission between the controller 10 and the host computer 32 and, in a preferred embodiment, includes 8 data bits with 1 stop bit and no parity at 9600 bps. A simple, close coupled data protocol supports host computer 32 reading and writing of data from/to the associated transponder by means of the controller 10. In the embodiment above-described, a maximum of four words (8 bytes) of transponder data will be handled at a time and host computer 32 interface operations will occur only when the controller 10 is not reading data from, or writing data to, the transponder. Error detection and correction operations are relegated to the host computer 32 which can embed a cyclical redundancy check ("CRC") or other check bit field with the data written to the transponder and check the same when reading by storing the error check bits in the transponder memory. It is also possible for the controller 10 to read data from the transponder twice in order to provide error detection and this method frees transponder memory space while increasing the read time. In most applications, the controller 10 and host computer 32 will read and error check the data after writing the same to the transponder.

Additionally, controller 10 may comprise either auditory or visual indicators such as beeper interface 26 or light emitting diodes ("LED") 28 to apprise an operator that communications has been initiated and/or effectuated with controller 10 when a transponder enters the effective radius of the electromagnetic field of the controller 10. A power supply 30 provides the requisite regulated power levels of approximately 5 volts direct current ("DC") to the various components of the controller 10 from an input source of 7.2 to 24 volts DC.

In operation, the microcomputer 12 of controller 10 provides the excitation frequency signal output to the coil drive circuit 16 which, by means of the associated antenna coil 18, generates an RF magnetic field to power a transponder by magnetic induction, as will be more fully described hereinafter. The microcomputer 12 FSK modulates the powering signal to write data and transmit commands to an associated transponder. To read data transmitted from the transponder to the controller 10, the microcomputer 12 signal processes the PSK encoded signal from the transponder which is received by the antenna coil 18 and detected, amplified and filtered by the read channel 20.

As previously described, the microcomputer 12 communicates transponder data for reading and writing operations to a host computer 32 via a simple serial data interface, such as through the Wiegand drivers 22, or a half duplex asynchronous RS-232 interface 24. The controller 10 utilizes the host computer 32 for data entry, storage and display functions. As will be described in more detail hereafter, the controller 10 formulates a digital message for FSK modulation of a 125 KHz signal for powering and communicating with a passive RF transponder. The powering FSK modulated signal from controller 10 is shifted from 125 KHz to 116.3 KHz and then back to 125 KHz to send a data pulse to the transponder for transmitting commands and writing data to the transponder. Similarly, controller 10 is capable of receiving a PSK modulated signal of 62.5 KHz which is Manchester encoded. As previously described, the controller 10 serves to detect and decode this signal by means of antenna coil 18, read channel 20 and microcomputer 12. As will be more fully described hereinafter, data synchronization is determined by the controller 10 when it detects a special synchronization pattern followed by a start bit. The data transmission rate of the communication system comprising controller 10 in the embodiment shown is 125/64 Kbps or 1.953 Kbps.

Figure 3:
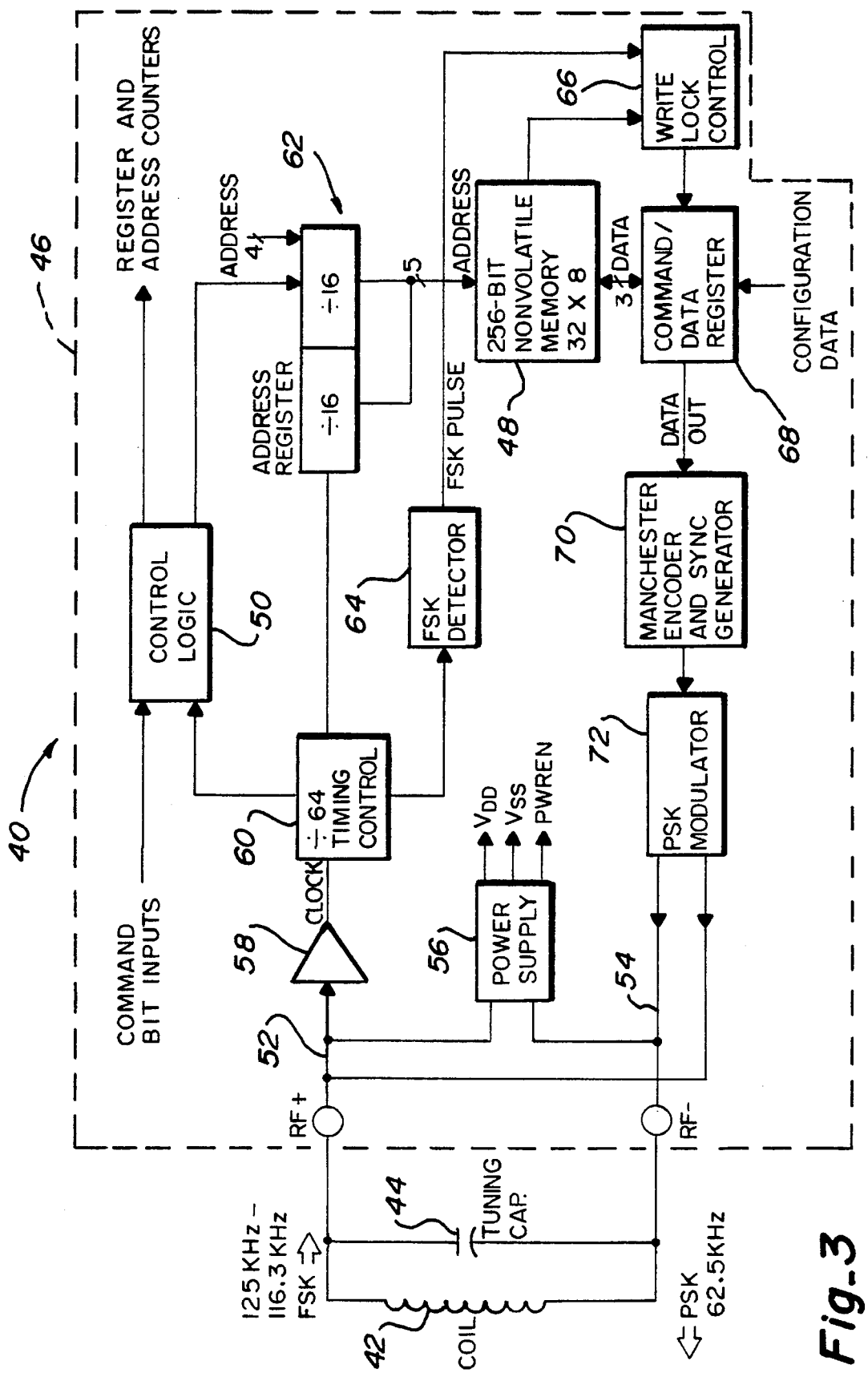
FIG. 3 is a logic block diagram of a passive RF transponder in accordance with the present invention forming, in conjunction with the controller of FIG. 1, part of the communication system disclosed which is capable of receiving an FSK signal input for deriving on-chip power and command inputs and transmitting PSK signals in response thereto.

With reference now to FIGS. 2A–2H, the logic flow for the firmware of microcomputer 12 of controller 10 is shown in the form of a logic flow chart. In conjunction with the depiction of the microcomputer 12 firmware, it should be again noted that the unmodulated RF (or "write") carrier transmitted by the controller 10 is 125 KHz and the modulated write carrier is 40/43 of the unmodulated write carrier, or approximately 116.3 KHz. The RF signal (or "read" carrier) transmitted by the transponder 40 (as shown in FIG. 3 and more fully described hereinafter) is ½ of the unmodulated write carrier or, 62.5 KHz. The microcomputer 12 executes 5 million instructions per second ("MIPS") or 40 operations per cycle of the unmodulated write carrier. This also corresponds to 43 operations per cycle of the modulated write carrier. The data bits are modulated one bit per 64 write carrier cycles or, about 1.9K bits per second. The write modulation, as previously described is FSK while the read modulation is Manchester encoded PSK. That is, there are 16 read carrier cycles per Manchester half bit. The write carrier is generated by "toggling" the carrier output bit every 20 and 20 microcomputer 12 instructions to generate unmodulated signals or, every 21 and 22 instructions to generate modulated signals. These togglings are interspersed throughout the firmware of the microcomputer 12 of controller 10 and are not shown in the logic flow chart of FIGS. 2A–2H.

The functionality of the firmware directed process of microcomputer 12 is initiated with a reset step 150 before entering a "GetCommand" loop beginning with a GetCommand step 152. From GetCommand step 152, a receive serial ("RxSer") subroutine 154 is entered which sets one character into the command. The RxSer subroutine 154 begins with a RxSer step 156. At RxSer step 156, the serial input pin is "_SerRxBit" the value of temp3 signifies the count and FSR is the indirect pointer to the receive buffer.

From RxSer step 156, a loop is entered at _SerRxBit decision step 158 to wait for a start bit which, when zero, then proceeds to a delay ½ bit interval step 160 to set up sampling at the middle of each bit. At temp2=8 step 162, the value in temp2 is set equal to 8 for an 8 bit communications format utilizing no parity. At step 164, a delay of one bit interval is entered and at step 166 the SerData is shifted right one bit in order to put the least significant bit ("LSB") first. At step 168, SerData.7 is set equal to _SerRxBit such that SerData.7 is the high order bit position of SerData. At step 170, the contents of temp2 are decremented and at decision step 172, if the value of temp2 is greater than zero, the RxSer subroutine 154 loops back to step 164 to delay for another one bit interval. If the value in temp2 equals zero, then at step 174, a delay of ¾ bit intervals is entered and FSR is set equal to addr(SerData) at step 176. At return step 178, the firmware returns to the GetCommand loop beginning with GetCommand step 152.

At decision step 180, if the command is "b" (beep) then at GotBeep step 182, a subroutine is entered beginning with GotBeep step 184. At step 186, temp1 is set equal to 256 and the speaker output of the controller 10 connected to the beeper interface 26 is toggled. At step 190, the LED's 28 are also toggled and at step 192 the value in temp1 is decremented. At decision step 194, when the value in temp1 is equal to zero following 256 iterations through the loop, a transmit serial ("TxSer") step 196 is entered as shown with 1 char hex. "01". Otherwise, at decision step 194, the subroutine returns to step 188 to again toggle the speaker output. Following step 196, the GotBeep subroutine 182 returns to the GetCommand step 152 of the GetCommand loop.

At decision step 198, if the command is "e" (echo), then the firmware process proceeds to GotEcho step 200 for a subroutine beginning with GotEcho step 202. At step 204, the character command is incremented whereby, for example, if the command was "e" it then becomes "f", which is an arbitrary response used to verify the presence of the controller 10. At step 206, a TxSer one character command is executed whereupon the GotEcho subroutine 200 returns to the GetCommand step 152 of the GetCommand loop.

If the command received is neither "b" nor "e", then at decision step 208, the command is checked to see whether it is "z" (wait for transponder), "r" (read transponder), "w" (write to transponder), or "n" (wait for transponder to be removed). If the command is either "z", "r", "w" or "n", then communication is initiated with the transponder 40 ("Tag") at DoTagComm step 210 to subsequently enter a subroutine beginning with StartTagComm step 212.

From DoTagComm step 210, the firmware process proceeds to decision step 211, where if the command is "n", the StartTagComm step 212 is executed. If the command is not "n", then decision step 213 tests to determine if the command is "z". If the command is "z", step 215 is executed to clear CommandData1 and the StartTagComm step 212 is begun. Otherwise, at step 217, a RxSer subroutine at step 156 is begun with 3 chars at CommCount and temp3 is set equal to 2*CommCount at step 219.

At decision step 221, if the command is "r" then the StartTagComm step 212 is begun. If the command is determined to not be "r", at step 223 a RxSer subroutine at step 156 is begun with CommCount chars at TagDataStart and the process then proceds to StartTagComm step 212.

The first step in initiating communications with the transponder 40 is to turn on the carrier power of the controller 10 at step 214 and then set SampleDelay equal to 32 at step 216. At step 218, a timeout is set equal to 6 milliseconds and the firmware proceeds to FindSync step 220 to begin to attempt to establish synchronization between the transmissions received by the controller 10 from the transponder 40 and those signals transmitted by the controller 10 to the transponder 40 as will be more fully described hereinafter. At decision step 222, if _SerRxBit is equal to zero, an interrupt is generated to the serial port of the controller 10 at step 224 and the firmware returns to the GetCommand step 152 of the Get Command loop. If the _SerRxBit is not equal to zero then at decision step 226, a DutyCycle interrupt at step 228 may be effectuated to then perform a duty cycle interrupt subroutine. It should be noted that the aforementioned serial port interrupt of step 224 and duty cycle interrupt of step 228 are checked at numerous places throughout the actual firmware of controller 10 microcomputer 12 and are not all shown in the logic flow chart of FIGS. 2A–2H in order to facilitate understanding of the other firmware functions.

At step 232, a sample phase ("SamplePhase") subroutine is begun with the compare flag ("CompareFlag") set equal to zero. The SamplePhase subroutine 232 begins with SamplePhase step 234 and a delay is entered at step 236 for SampleDelay cycles to allow the communicating transponder 40 to set the start time. At step 238, PSK1v1 is set equal to _PSKRx where the latter is the input bit from the receive signal. At step 240, the value in edge1 is incremented to count cycles until the first zero crossing of the PSK (read) signal transmitted from the transponder 40. At decision step 242, if _PSKRx=PSK1v1, the firmware returns to step 240 to again count cycles until the first zero crossing of the received PSK signal. If _PSKRx is not equal to PSK1v1 then the value in edge1 is again incremented at step 244 to count cycles to the second zero crossing. It should be noted that the actual resolution of the count is five instructions or, stated another way, 1 microsecond or 1/16 read carrier periods. At decision step 246, if _PSKRx is now equal to PSK1v1 then the firmware proceeds to step 248. Otherwise, the firmware returns to step 244 to again count cycles to the second zero crossing.

At step 248, the firmware proceeds to step 250 where, if _PSKRx is now equal to PSK1v1, an additional loop is entered to increment the value in edge3 otherwise the firmware proceeds to step 252. At step 252, the value in edge3 is set equal to the value in edge3 plus the value in edge2. In this manner, the value in edge3 is now representative of the time between the first and third zero crossings. At decision step 254, if the value now in edge3 is between 14 and 18, the phase midpoint ("PhaseMidPoint") is set equal to the value in edge2+2*edge1. This phase midpoint is then the mean of the first and second zero crossings doubled. However, if the value in edge3 is not between 14 and 18, then at step 256 the value "BadSample" is set equal to one and, by means of return step 258, the subroutine of SamplePhase step 232 is completed. This is because the PSK modulated carrier from the transponder 40 must be 16 ±1 or else it is rejected as noise. In like manner, at decision step 262, if _CompareFlag=0 then at return step 286, the SamplePhase subroutine 232 is completed. If _CompareFlag=1, then ComparePhases subroutine 264 is entered.

The ComparePhases subroutine 264 is initiated by a ComparePhases step 266 and followed by step 268 where the value in temp1 is set equal to the absolute value of RefMidPoint-PhaseMidPoint to establish the absolute difference between the two values. At step 270 the value in temp2 is set equal to RefLev exclusive or'd ("XOR") with ReadLev to establish differential decoding.

At decision step 272, if the value of temp1 is less than 5, return step 274 completes the ComparePhases subroutine 264 and if the value in temp1 is not less than 5, at decision step 276, the value of temp1 is checked to see if it is between 11 and 21. In this manner, if the phase change corresponds to 4/32 cycles, the value in temp2 is the returned data bit value. If the value of temp1 is not between 11 and 21 it is considered a bad sample at step 278 and BadSample is set equal to "1" and the firmware proceeds to return step 280. If the value of temp1 is between 11 and 21 then the value in temp2 is inverted at step 282. That is, if the phase has changed by 16/32 ±4/32 the value of temp2 is inverted, or rotated 180 degrees. At return step 284, the ComparePhases subroutine 264 is completed and, at decision step 262, return step 286 completes SamplePhase subroutine 232.

At decision step 288, if a bad sample ("BadSample") is found as a result of steps 256 or 278, the firmware returns to FindSync step 220. Otherwise, at step 290 the value in temp3 is set equal to 9. At step 292, RefMidPoint is set equal to PhaseMidPoint and RefLevel is set equal to ReadLevel at step 294 to begin a find synchronization loop ("FindSyncLoop") at step 296.

From step 296, a SamplePhase subroutine 298 with the CompareFlag set equal to one begins with SamplePhase step 234 as previously described. Following step 298, the value SampleDelay is set equal to 10, that is, approximately 1/6 bit. At decision step 302, if the value of temp2 is equal to zero, the firmware process proceeds to step 304 to decrement the value in temp3 at step 304. If the value of temp2 is not equal to zero then the process returns to FindSync step 220 to start over if carrier modulation of the 62.5 KHz signal from the transponder 40 is detected. Alternatively, the firmware process stays in the FindSyncLoop if the carrier remains unmodulated as will be more fully described hereinafter. At decision step 306, if the value of temp3 is not equal to zero a return is made to step 296. If, however, temp3 is equal to zero the firmware process of microcomputer 12 moves to step 308. With respect to decision step 306 it should be noted that 9× is 1-½ bits which is a Manchester coding violation that signifies receipt of a synchronization pattern.

At step 308, RefMidPoint is set equal to PhaseMidPoint. At step 310 RefLevel is set equal to ReadLevel. At find edge ("FindEdge") step 312, synchronization is begun with the start of the first data bit. At step 314, the SamplePhase subroutine is again entered with the CompareFlag set equal to one beginning with step 234.

At decision step 316, if the data bit is not equal to one, then the firmware process returns to FindSync step 220. If, however, the data bit is equal to one at decision step 316, the firmware process then proceeds to step 318 where the SamplePhase subroutine is entered with the CompareFlag equal to one at step 234. Following step 318, RefMidPoint is set equal to PhaseMidPoint at step 320. At step 322 RefLevel is set equal to ReadLevel and synchronization has been found at step 324.

At FoundSync step 324, a determination is made at decision step 326 as to whether the received command was equal to "z". From decision step 326, the value of _WriteFlag is then set equal to "1" (if false) or "0" (if true) at steps 328 or 330 respectively. In like manner, at decision step 332 if the write command is equal to "w", the value of temp3 is set equal to "2" (if false) or to "2+CommandCount" (if true) at steps 334 or 336 respectively.

At step 338, the microcomputer 12 firmware process enters a transmit communications loop ("TCommLoop") where, at decision step 340 it is determined whether the value in _WriteFlag has been set equal to "1" or "0" at the preceding steps 328 and 330 respectively. If the value in _WriteFlag is equal to one, i.e. "true", then a do write ("DoWrite") subroutine 342 is entered beginning with step 344.

Following the "DoWrite" step 344, a count down is entered to delay to the FSK slot appropriate to do the write to invert the desired bit at step 346. At decision step 348, it is determined whether or not a "one" should be written to the associated transponder 40 in synchronization with the data being transmitted from the transponder 40 to the controller 10. If a "one" bit is to be transmitted to the transponder 40, this means that the bit should be inverted in the transponder 40 non-volatile memory 48. This is effectuated by toggling the controller 10 carrier from 125 KHz to 116.3 KHz for ½ bit time at step 350. If the decision is made that the controller is not writing a "one" at step 348, or has completed the operation of step 350, the firmware proceeds to step 352 signifying the finish of the write operation ("FinishWrite"). At this point, the carrier from the controller 10 is returned to the unmodulated 125 KHz for the remainder of the bit time. A FinishTcomm subroutine 356 is thereupon entered.

At FinishTcomm step 358, a rotate bit mask step 360 is undertaken to proceed to decision step 362 where a determination is made as to whether the eighth, or last bit has been completed. If the eighth bit has not yet been completed, the subroutine returns to the TCommLoop step 338, otherwise the FSR pointer is incremented at step 364 and the bit mask is initialized at step 366. At step 368, the value of temp3 is decremented and then tested at decision step 370 to determine whether or not the value has reached zero. If the value of temp3 is not equal to zero, the transmit communication loop of TCommLoop step 338 is again entered. If the value in temp3 is equal to zero then the FinishTcomm subroutine 356 is completed at step 372.

At decision step 340, if _WriteFlag is not equal to one, then a SamplePhase subroutine 374 beginning at step 234 is entered with the CompareFlag set equal to one. At step 376, an additional SamplePhase subroutine beginning at step 234 is again entered with the CompareFlag set equal to one. At step 378, the appropriate bit is inserted into the buffer and the firmware process then proceeds to enter the FinishTcomm subroutine 356 as previously described.

With reference additionally now to FIG. 3, a transponder 40 for use in conjunction with the controller 10 of FIG. 1 is shown forming a passive, proximity RF read/write card of the communication system of the present invention. Transponder 40, which may furnished including a single, integrated, monolithic complimentary metal oxide semiconductor ("CMOS") application specific integrated circuit ("ASIC") forming an integrated circuit 46, has an external antenna coil 42 and associated parallel connected tuning capacitor 44. Transponder 40 may be advantageously furnished as a card sized RF/ID tag having approximate physical dimensions of 3.375 inches (85.7 mm) by 2.125 inches (54.0 mm) by 0.030 inches (0.76 mm). Integrated circuit 46, in addition to the additional analog and digital logic circuits as shown, further integrates a non-volatile memory 48 which, in a preferred embodiment, may be a ferroelectric memory device such as a FRAM® memory array available from. Ramtron International Corporation of Colorado Springs, Colo.

In the embodiment shown, antenna coil 42 and tuning capacitor 44 are external to integrated circuit 46. Antenna coil 42 may be a 4.65 µH coil while tuning capacitor 44 may be a 270 pF device. The combination of antenna coil 42 and tuning capacitor 44 provides a resonant circuit for receiving the FSK encoded powering signal from the controller 10. Through the use of an FSK powering signal, the average power level received by the transponder 40 as the FSK signal is shifted from 125 KHz to 116.3 KHz remains constant and, through the use of a ferroelectric device for non-volatile memory 48 and PSK modulated transmission from the transponder 40 to the controller 10, allows for a generally equidistant read/write capability for the communications system of the present invention. It should further be noted, that tuning capacitor 44 may not be necessary in certain applications when the antenna coil 42 has sufficient inherent capacitance to itself provide the necessary resonant circuit for receiving the FSK modulated signal from the controller 10 and/or transmitting the phase coherent Manchester encoded PSK signal to the controller 10.

Transponder 40 is inductively powered via the FSK modulated signal from controller 10 induced across the RF+ terminal 52 and RF– terminal 54. The incoming FSK modulated data signal is supplied as input to amplifier 58 to provide a clock input signal to timing control circuit 60 as shown.

The output of timing control circuit 60 is applied as one input to control logic 50 having an additional command bit input from command data register 68 as will be more fully described hereinafter. Timing control circuit 60, which comprises a digital counter, also provides an input to address register 62 as shown. Timing control circuit 60 further provides a signal input to FSK detector 64 for demodulating the FSK modulated command and data bits transmitted to transponder 40 by controller 10.

The subject matter of a preferred embodiment of the FSK detector 64 is more fully described in U.S. patent application Ser. No. 08/194,694 for "INTEGRATED ASYNCHRONOUS FSK DETECTOR AND METHOD". A possible alternative embodiment for FSK detector 64 is more fully described in U.S. patent application Ser. No. 08/194,708 for "FSK DETECTOR CIRCUIT AND METHOD". These two patent applications were both filed concurrently herewith are and assigned to the assignee of the present invention. Their disclosures are hereby specifically incorporated by this reference.

Output of control logic 50 is supplied as input to address register 62 as well as command data register 68 as shown. The row and column address information output from address register 62 is utilized to address specific bits of the words, or rows, of the data maintained within non-volatile memory 48. Non-volatile memory 48 also supplies an input to write lock control 66 having an additional FSK pulse input from FSK detector 64. Write lock control 66 provides a controlling input to command data register 68 which is bi-directionally coupled to non-volatile memory 48 in order that data may be written to, or read from, the non-volatile memory 48 in accordance with the address defined by address register 62. Command data register 68 also receives the "hard-wired", or preset, configuration information for the transponder 40 which is utilized to form the PSK modulated configuration word transmitted to the controller 10 when the transponder 40 is powered by the FSK modulated signal from the controller 10 as will be more fully described hereinafter.

The output of the command data register 68 comprising either the configuration data or data read from the nonvolatile memory 48 is supplied as input to Manchester encoder 70 which further functions as a synchronization ("sync") generator. Output of the Manchester encoder 70 is supplied as input to the PSK modulator 72 for application to the antenna coil 42 and resonant tuning capacitor 44 connected in parallel between RF+ terminal 52 and RF– terminal 54 of integrated circuit 46.

Power supply 56, which is utilized to derive the requisite power to operate transponder 40 when within the effective radius of the electromagnetic field provided by the FSK modulated signal from controller 10, provides a source of $V_{DD}$, $V_{SS}$ and PWREN to the integrated circuit 46. Power supply 56 is more fully described in U.S. patent application Ser. No. 08/194,707 for "Power Supply and Power Enable Circuit for a RF/ID Transponder" filed concurrently herewith and assigned to the assignee of the present invention, the disclosure of which is hereby specifically incorporated by this reference.

As previously noted, power supply 56, in addition to providing operating power to the transponder 40, provides a PWREN signal to the transponder 40 control logic 50 and non-volatile memory 48 to ensure that such logic blocks are held in a reset condition until such time as a sufficient level of power is induced in the antenna coil 42 by inductive coupling to the RF field of an associated controller 10, and hence supplied to the transponder 40 logic, to ensure proper functionality.

In operation, as the transponder 40 enters the RF field of an associated controller 10, the on-board transponder 40 power will rise from approximately 0 volts towards a level of between 1.5 to 2.0 volts which is generally insufficient to enable operation of any of the on-board logic blocks. As the transponder 40 is further introduced into the RF field of the controller 10, the induced voltage will reach a level of indeterminate operation of various ones of the on-board logic blocks in the range of 1.5 to 2.5 volts. At this point, for example, the timing control circuit 60 may begin functioning, and, as will be more fully described hereinafter with respect to FIG. 5, its Q1 output, which divides the incoming RF signal frequency by two will be utilized to provide an unmodulated RF signal for transmission back to the associated controller of 125/2 KHz (or 62.5 KHz). At this level of on-board transponder 40 operating voltage levels, the PWREN signal still ensures that the logic of the control logic 50 and non-volatile memory 48 is maintained in a reset condition.

As the transponder 40 power levels increase due to its further introduction into the RF field of an associated controller 10, the on-board voltage will rise to a level greater than approximately 5.25 volts at which point the control logic 50 and non-volatile memory 48 have more than sufficient operating voltage to ensure their proper operation since they may actually function properly at approximately 4.5 volts. At this point, the PWREN signal allows the transponder to function in its "normal" mode of operation and the transponder 40 will continuously transmit its configuration word 100 until receiving a read or write command from the associated controller 10, as will be more fully described hereinafter with respect to FIG. 4A. In addition, the finite state machine logic of the control logic 50 will be reset as will be more fully described hereinafter with respect to FIG. 5. It should be noted that a certain amount of hysteresis is built into the power supply 56 functionality such that the induced voltage may actually vary between approximately 4.75 to 5.25 volts before again causing the transponder 40 logic to be reset. This is designed to ensure that the functional operation of the transponder 40 does not oscillate about the 5.25 voltage point as the induced voltage varies within the operating range of the control logic 50 and non-volatile memory 48.

Once the transponder 40 is in the process of being removed from the RF field, and the on-board voltage drops below a point of approximately 4.75 volts, the PWREN signal will again hold the control logic 50 and non-volatile memory 48 in a reset condition, and the transponder 40 will then transmit an unmodulated 62.5 KHz signal, until the induced voltage level drops below that necessary for the timing control circuit 60 and other associated logic blocks to function. The transponder 40 will, if in the process of performing a read or write operation while the on-board power drops below the normal operating voltage range of 4.75 to 5.25 volts, complete the desired function on the byte of information it is then currently processing.

As previously described, the transponder 40 is inductively powered via the antenna coil 42 coupled to integrated circuit 46 by means of power supply 56 in response to the electromagnetic field generated by an associated controller 10. The transponder 40 communicates, by means of the antenna coil 42, with the associated controller 10 in order that the controller 10 can read and write data from/to the responder 40 non-volatile memory 48.

The transponder 40 integrated circuit 46 includes 256 bits of non-volatile memory 48, preferably a ferroelectric memory device utilizing PZT, organized as sixteen 16-bit words, which are designated words 0–15. (The configuration word may be considered a hard-wired seventeenth word.) In the embodiment illustrated, non-volatile memory 48 may have an actual memory organization of 32×8 bits. The transponder 40 operates only when it is powered by an alternating current ("AC") signal induced in antenna coil 42 from the FSK modulated signal transmitted from controller 10. The transponder 40 rectifies the AC signal in power supply 56 to derive the DC power for its associated analog and digital logic circuitry and the non-volatile memory 48. A logic clock is derived from the induced AC signal by means of amplifier 58 and timing control circuit 60. The powering signal is modulated by the controller 10 to send data and commands to the transponder 40 and the powering signal is shifted, as previously described, from 125 KHz to 116.3 KHz and back to 125 KHz in a short burst to send a single bit of a command or data to the transponder 40. When the transponder 40 has sufficient induced DC voltage (on the order of 5 volts) to operate the non-volatile memory 48, it operates in the "normal" operational mode. When the DC voltage is insufficient to operate the non-volatile memory 48, but sufficient to properly operate the associated logic, the transponder 40 will transmit an unmodulated 62.5 KHz carrier signal.

In operation, transponder 40 is introduced, by an individual carrying the same, within the FSK modulated RF electromagnetic field of a controller 10 within a radius sufficient to induce operational power in the transponder 40 in order to render the internal logic and non-volatile memory 48 of the integrated circuit 46 operational. The transponder 40 will then be in its "normal" operational mode.

With reference now to FIG. 4A, the configuration word 100 which is transmitted from the transponder 40 to the controller 10 when in the "normal" operational mode is shown. Configuration word 100 comprises a synchronization block 102 comprising logic level zero bits D0–D3 followed by a single logic level one start bit 104 comprising bit D4. The start bit 104 is followed by a number of lock bits 106 which, in the embodiment shown, comprise lock bits L0–L3 forming bits D5–D8 of the configuration word 100. The lock bits 106 are succeeded by a number of mask bits 108 which, in the embodiment shown, may comprise mask bits M1 and M2 comprising bits D9 and D10 of the configuration word 100.

Configuration word 100 also includes a number of type bits 110 which follow the mask bits 108. Type bits T3–T5 comprise bits D11–D13 of the configuration word 100. The configuration word 100 ends with two logic level zero bits which correspond to the command bits of a command word transmitted by a controller 10 as will be more fully described hereinafter. The two logic level zero bits comprise bits D14 and D15 of the configuration word 100.

As previously described, the synchronization block 102 comprises four bit times of a logic level zero signal which are then followed by a single logic level one start bit. The synchronization block 102 and start bit 104 are utilized by the associated controller 10 to synchronize the transmission of commands in either the half duplex or full duplex modes of operation as will be more fully described hereinafter. The lock bits 106 may be set by writing to the appropriate bits in word 0 and are utilized to write protect designated blocks of words within the non-volatile memory 48 in order to preclude writes thereto. As an example only, if bit L0 is a logic level one, the entire contents of the non-volatile memory 48 comprising rows 0 through 15 are locked thereby precluding any further writes to the non-volatile memory 48 by the controller 10. Conversely, if lock bits L0–L3 are all logic level zero, none of the contents of the non-volatile memory 48 are precluded from being overwritten by a complementing FSK pulse from the controller 10.

By setting selected ones of the lock bits 106, (which are contained within word 0 of the non-volatile memory 48) selected blocks of rows of the non-volatile memory 48 may be locked from having data written to them by controller 10. For example, if bit L2 of the lock bits 106 is a logic level one and the remaining ones of the lock bits 106 are logic level zero, rows 1–3 of the non-volatile memory 48 are locked. Similarly, if lock bit L3 of the lock bits 106 is a logic level one and the remaining bits are a logic level zero, rows 1–5 are locked. In like manner, by setting bits L2 and L3 to logic level one while the remaining bits of lock bits 106 are at a logic level zero, rows 1–7 are locked. By setting bit L1 of the lock bits 106 to a logic level one, row zero of the non-volatile memory 48 is locked except for the bits 0–3 thereof.

By means of the mask bits 108 and type bits 110, unique identification of a particular transponder 40 may be established which is communicated to the controller 10 by means of the configuration word 100. The mask bits 108 may be set during the initial processing or manufacture of the integrated circuit 46 while the type bits 110 may be set by being written to by an associated controller 10.

Data from the transponder 40 is, as previously described, transmitted at 62.5 KHz utilizing a phase coherent, Manchester encoded PSK RF signal. The associated controller 10 detects and decodes this signal and data synchronization is determined by the controller 10 when it detects the sync block 102 followed by the start bit 104. This four bit time synchronization block 102 and start bit 104 comprising a 62.5 KHz modulated carrier is transmitted by the transponder 40 as the first five bits of the configuration word 100. The configuration word 100 is transmitted by the transponder 40 when it is properly powered and whenever data read from the non-volatile memory 48 is not being sent or data is not being received from the associated controller 10 to be written to the non-volatile memory 48.

With additional reference now to FIG. 4B, an associated controller 10 either reads from, or writes to, the non-volatile memory 48 of the transponder 40 by sending a command word 112. The command word 112 is transmitted in bit for bit synchronization with the configuration word 100 or any data being sent from the transponder 40 to the controller 10. The command word 112, therefore, incorporates a corresponding synchronization block 114 comprising logic level zero bits D0–D3 followed by a logic level one start bit 116 comprising bit D4 of the command word 112.

The command word 112 further includes a word address 118 comprising a block of bits designated A8–A0 comprising D5–D13 of the command word 112. The word address 118 is followed by two command bits 120 designated C1 and C0 corresponding respectively to bits D14 and D15. The word address 118 is utilized to designate a specific word, or row, address within the non-volatile memory 48 of the transponder 40 which the controller 10 desires either to read, or to write by complementing selected bits at the designated word location. The command bits 120 are utilized to provide commands to the transponder 40. When the command bits 120 are both logic level zero, the transponder 40 is in its "idle" mode whereby the configuration word 100 is continuously transmitted to the controller 10 by means of the aforementioned PSK modulated RF signal. By setting the command bits 120 of the command word 112 to a state where bit C1 is a logic level one and bit C0 is logic level zero, the associated transponder is commanded to read out the contents of the non-volatile memory 48 at the word address corresponding to the word address 118 of the command word 112. Alternatively setting both of the command bits 120 to a logic level one provides a command to the transponder 40 to read out the entire contents of the non-volatile memory 48 beginning with the word specified by the word address 118 of the command word 112.

In operation, in order to read or write data to the non-volatile memory 48 of the transponder 40, the controller sends a command word 112 specifying the appropriate word address 118 and command bits 120 in synchronization with the PSK modulated configuration word transmitted from the transponder 40 to the controller 10. The command word 112 specifies the starting address of the word(s) to be read or written by means of the word address 118. The command word 112 then specifies that either a single word, word n, is to be read or written or that multiple words, word n through word 15, are to be read or written. The controller 10 sends the command bits 120 after reading the synchronization block 102 and start bit 104 of the configuration word 100. The sending of the command word 112 bits is bit-by-bit synchronized with the timing of the bits of the configuration word and any data following by timing from the synchronization block 102 and start bit 104. The controller 10 sends FSK bursts of 116.3 KHz to complement the bits it desires to change following receipt of the synchronization block 102 and start bit 104. The controller 10 must first know the contents of the non-volatile memory 48 of the transponder 40 in order to determine what the current data is in order to then know which bits to complement.

To read data from the transponder 40 the controller 10 issues a command by the appropriate setting of the command bits 120 of the command word 112 specifying a starting memory word address n within the non-volatile memory 48. Immediately following the receipt of the command bits 120, the transponder 40 sends data from the non-volatile memory 48 starting with word n. To write data to the non-volatile memory 48 of the transponder 40, the controller 10 issues a command by the appropriate setting of the command bits 120 of the command word 112 specifying the starting word address n of the non-volatile memory 48. Immediately following receipt of the command bits 120, the transponder 40 sends data from its non-volatile memory 48 starting with word n.

In order to write new data, the controller 10 sends FSK modulated data to the transponder 40 for the same word being read and transmitted by the transponder 40. To accomplish this, the controller 10 sends an FSK burst of 116.3 KHz for, and during the time period of, each bit that it wishes to complement. Therefore, when the controller 10 sends no FSK burst, the data in the transponder 40 non-volatile memory 48 remains unchanged.

As previously described, in order to inhibit writes to selected memory locations, the transponder 40 also has a memory locking, or write protection, feature to enable specific blocks of the non-volatile memory 48 to be locked from writes from the controller 10. By setting the appropriate lock bits in word 0 of the non-volatile memory 48, specific blocks of the non-volatile memory 48 may be locked or the entire contents of the non-volatile memory 48 may be locked. Once a lock bit of the lock bits 106 is set, it cannot be changed.

Upon power up of the integrated circuit 46 of the transponder 40, the contents of the lock bits 106 of the non-volatile memory 48 word 0 are copied to the write lock control 66 register to then inhibit the writing of the locked memory block(s) through the command data register 68. Therefore, when one or more of the lock bits is set, the locking, or write protection, does not take effect until the next power up of the transponder 40. In the embodiment described, the four lock bits may be located in bits 12–15 of word 0 of the non-volatile memory 48. The status of these lock bits is transmitted in the configuration word 100 as bits D5–D8 comprising lock bits 106 and can be read by the controller 10 with a normal read of the contents of memory word 0 of the non-volatile memory 48.

With reference additionally now to FIG. 5, portions of the timing control circuit 60 and the control logic 50 of the transponder 40 are shown in more detail. As previously described, the timing control circuit 60 receives a clock input signal from the amplifier 58 shown in FIG. 3. The timing control circuit may comprise a ten bit synchronous counter driven by this clocking input signal. The outputs of the timing control circuit 60 are designated Q1–Q10, with each output being the equivalent of the preceding output divided by two beginning with signal Q1 equal to the clock signal CK/2. The timing control circuit 60 also provides the complement of the signals Q1–Q10 (designated $\overline{Q1}$–$\overline{Q10}$) and keeps track of each 16 bit block received by the transponder 40.

The output of timing control circuit 60 is supplied as input to the control logic 50 as previously described. Control logic 50, now shown in more detail, further comprises a state logic block 76 and associated next state logic block 78. The state logic block 76 of control logic 50 receives an input from address register 62 designated "ROWF" which determines when the last word, or row, of the non-volatile memory 48 has been reached which, in the case of a sixteen word memory array would equal row "F" in hexadecimal. The state logic block 76 also receives a $\overline{Q10}$ input signal from the output of timing control circuit 60 in addition to the state of the command bits from the output of command data register 68 which further provides the designated address bits comprising the address word 118 of the command word 112 received by the transponder 40.

The control logic 50 further provides an input to the write lock control 66 to inhibit writes to selected memory locations of the non-volatile memory 48 as previously described. The control logic 50 provides the logic function to the transponder 40 to convert the output of the timing control circuit 60 and the outputs of the state logic block 76 and next state logic block 78 to provide the requisite control signals for the logic functionality of the integrated circuit 46 of the transponder 40. The state logic block 76 and next state logic block 78 comprise a three bit latch register utilized to keep track of the command that has been entered into the command data register 68 of the transponder 40 by the command bits 120 of the command word 112.

The address register 62 designates the row address "ROWADD" and column address "COLADD" signals to access the selected bits within the words of the non-volatile memory 48 array. The address register 62 is responsive to the control logic 50 and the command data register 68 and controls the state logic block 76 of the control logic 50. The address register comprises a series of latches that hold the current address as well as the logic necessary to interface the particular address to the non-volatile memory 48.

The command data register 68 receives the output of the non-volatile memory 48 as designated by the "ROWADD" and "COLADD" signals from the address register 62. The command data register 68 receives an input signal from the Q6 output of timing control circuit 60 as well as a write signal from the write lock control 66. The command data register 68 is an eight bit register configured to allow shifting, parallel loading and asynchronous setting or clearing and includes the appropriate interface to the non-volatile memory 48 and the logic necessary to load the hard-wired configuration data comprising the configuration word 100.

The output of the command data register 68 is supplied as an SRQ0 input to the FSK detector 64 and receives a "clear" signal from the output thereof. The FSK detector 64 provides an input signal to the write lock control 66, which consists of a four bit latch holding the lock bits during the current power up cycle of the transponder 40. The write lock control 66 also includes the logic necessary to disable writing to a locked address within the non-volatile memory 48.

The FSK detector 64 which receives an FSK pulse input from the timing control circuit 60 provides a data out signal from the command data register 68 to the Manchester encoder 70. The FSK detector 64 may consist of an internal oscillator, a four bit up/down counter and the logic necessary to determine the relative input frequencies of the FSK modulated RF signal output from the controller 10 as described in U.S. patent application Ser. No. 08/194,694 for "INTEGRATED ASYNCHRONOUS FSK DETECTOR AND METHOD". The Manchester encoder 70, which provides an output to the PSK modulator 72 as shown in FIG. 3, together comprise the logic necessary to Manchester encode and PSK modulate the output data to be transmitted back to the controller 10.

As previously described, the timing control circuit 60 is a synchronous counter driven by the clock "CK" output of the amplifier 58. When the integrated circuit 46 of the transponder 40 is powered down, all bits except the least significant bits ("LSB") are held to their preset value because of the PWREN command. The Q1 output is allowed to move to provide a carrier signal for transmitting back to the controller 10. Bit Q2 is preset low and all remaining bits are preset high. When power at the output of the power supply 56 is detected, the timing control circuit 60 is then allowed to count. This method of presetting allows a setup time sufficient to read the state of the lock bits in word 0 of the non-volatile memory 48.

The control logic 50 provides most of the logic to control the rest of the logic functionality of the transponder 40. Each signal at the output of the control logic 50 is a combination of the outputs of the timing control circuit 60 (Q1–Q10) or state information from the state logic block 76. The state logic block 76 and next state logic block 78 comprise a three bit latch and logic to detect when the current address of the memory of the non-volatile memory 48 has reached a hexadecimal value of "F".

With reference additionally now to FIG. 6, the state and next state logic of the control logic 50 is shown. The state logic block 76 is set to an initial state 130 ("000") by a power on reset ("POR") signal. From the initial state 130, the state logic block 76 is clocked to the next state of the next state logic block 78 on every falling edge of the signal Q10 from the output of the timing control circuit 60 shown as the first positive edge of $\overline{Q10}$ 132. The state machine then enters the idle state 134 ("010"). From the idle state 134, the next state depends on the logic levels of the command bits 120 of the command word 112 received from the controller 10. If the command bits 120 are respectively a logic level one and a logic level zero, the state machine then enters the read one word state 138 through the path command=10 136. The read one word state ("100") means that only the memory word designated by the word address 118 of the command word 112 will be read from the non-volatile memory 48.

If the command bits 120 of the command word 112 are both logic level one, the state machine enters the load address state 142 through the path command=11 140. The load address state 142 ("101") loads the address designated by the word address 118 of the command word 112 and returns to the idle state 134 if that word address is equivalent to word 15 (hexadecimal F) of the non-volatile memory 48. If the memory word designated by the word address 118 is not word 15, the state machine enters the increment address state 146 through the path row F=0 144. The state machine remains in the increment address 146 state until the word 15 (hexadecimal F) word of the memory array 48 is reached at which time it returns to the idle state 134.

Should the control logic 50 of the transponder 40 enter an invalid state, it transitions to the idle state 134 on the next state clock. The initial state 130 is never the next state and may only be entered through a power down. The next state depends upon the current state, the current address and the command bits.

By way of more detailed description of the aforementioned logic blocks, the address register 62 is a four bit latch with associated logic necessary to interface to the non-volatile memory 48. The four latches hold the row address of the memory and the column address is derived from the signal Q10 from the timing control circuit 60. The address register 62 includes the logic necessary to convert Q10 to a column address.

The command data register 68 is an eight bit latch with the requisite functionality to asynchronously set/clear as well providing a synchronous shift and parallel load function.

The write lock control 66 implements the lock bit mechanism of the transponder 40. The function of the lock bits contained in word 0 of the non-volatile memory 48 is to disable writing to certain memory locations therein based on the value of the lock bits as reported in the configuration word 100 as lock bits 106. Each of the four lock bits disables one or more rows of memory. In the normal mode of operation, the lock bits can be set, but not cleared. Therefore, when a particular memory block is locked, the transponder 40 will not allow that memory block to be subsequently unlocked. When the transponder 40 is powered up, it reads the state of word 0 and stores the lock bits in the lock bit register of the write lock control 66. To change the lock bits, word 0 must be written by the controller 10 with the desired values. Any change then becomes effective only when the chip powers down and then up again causing it to re-read the contents of word 0. Therefore, writing to the non-volatile memory 48 and the lock bits of word 0 is controlled by the current value in the lock bit register of the write lock control 66.

The FSK detector 64 is designed to detect changes in the incoming carrier frequency transmitted by the controller 10. In the embodiment above described, the FSK detector is designed to distinguish the difference between frequencies of 125 KHz and 116.3 KHz. The FSK detector 64 functions by counting pulses on an internal oscillator during a specific number of carrier frequency periods at two different times. If the number of pulses counted the first time (the calibration period) is the same as the second time period (called the measure period), then an FSK has not occurred. A calibration and measure is done during each bit time to compensate for different internal oscillator frequencies which may be due, for example, to process variations in the integrated circuit 46 of the transponder 40 or temperature fluctuations. Since the FSK detector 64 design measures differences in frequencies and not absolute frequencies, it is therefore not limited to being driven by the aforementioned two frequencies. Rather, the FSK detector 64 can detect the difference between any two signals that differ in period by 0.6 microseconds (for example, 400 KHz and 322.6 KHz).

The Manchester encoder 70 combines the output of the command data register 68 with the signal Q6 from the timing control circuit 60 to create the Manchester encoded signal. This signal is then combined with power up and synchronization information such that the controller 10 can recognize when the transponder 40 is powered up and sending the configuration word. The resulting signal is combined with the Q1 output of the timing control circuit 60 in the PSK modulator 72 shown in FIG. 3 to provide a carrier frequency equal to half of the incoming carrier frequency of 125 KHz, or 62.3 KHz.

The communication system provided by the combination of the controller 10 and associated transponder allows for both full and half duplex operation. In half duplex operation, the controller 10 will cause the transponder to read the contents of selected words of the non-volatile memory 48 in order to determine the contents. Thereafter, while causing the transponder to again read the contents of this memory location, an FSK pulse of 116.3 KHz will be sent in bit-for bit synchronization with the bits read out of the memory location of the transponder 40 in order to complement the selected bits that it is desired to change. In a conventional mode of operation, the controller 10 will then cause the transponder 40 to re-read the changed contents of the memory location(s) to verify that the write operation has been correctly accomplished. Thus, the half duplex mode of operation consists of a read/write/verify sequence.

In a full duplex mode of operation, the controller 10 can cause the transponder 40 to read the selected bits of the non-volatile memory 48, complement the desired bits as they are read out and verify that the complementing operation has been effectuated in a single bit time of approximately 512 microseconds.

What has been provided, therefore, is a passive RF transponder which incorporates a non-volatile memory element which may be powered by inductive coupling to a proximately located RF controller. The communication system and method of the present invention utilizes the controller to transmit an FSK modulated powering RF signal to cause the transponder to either read selected data from, or write selected data to, the non-volatile memory in response to established commands and transmit the same back to the controller utilizing PSK modulation. The communication system may operate in either full duplex or half duplex modes with the controller causing the transponder to simultaneously write data to its non-volatile memory array as the contents are read out and transmitted to the controller by complementing selected bits thereof.

While there have been described above the principles of the invention in conjunction with specific circuitry, it should be clearly understood that the foregoing is made only by way example and not as a limitation to the scope of the invention.

What is claimed is:

1. An RF transponder comprising:

an antenna for reception of an FSK modulated RF signal and transmission of a PSK modulated RF signal;

a detector circuit coupled to said antenna for demodulating said FSK modulated RF signal and producing a digital data signal in response thereto;

a control logic circuit coupled to said antenna and responsive to said FSK modulated RF signal;

a memory array responsive to said control logic circuit and said digital data signal for reading data from or writing data to said memory array;

a data encoder circuit coupled to said memory array for encoding said data read from said memory array; and a PSK modulator circuit coupled to said data encoder circuit and said antenna for modulating an RF signal in accordance with said encoded data to produce said PSK modulated RF signal.

2. The RF transponder of claim 1 further comprising:

a power supply coupled to said antenna for deriving a power source for said transponder from said FSK modulated RF signal.

3. The RF transponder of claim 1 wherein said memory array comprises a non-volatile memory array.

4. The RF transponder of claim 3 wherein said non-volatile memory array comprises a ferroelectric memory array.

5. The RF transponder of claim 1 wherein said FSK modulated RF signal is modulated substantially between 125 KHz and 116.3 KHz.

6. The RF transponder of claim 1 wherein said PSK modulated RF signal is substantially 62.5 KHz.

7. The RF transponder of claim 1 wherein said transponder is substantially 85.7 mm by 54.0 mm by 0.76 mm.

8. An RF transponder for receiving FSK modulated data from, and transmitting PSK modulated data to, an associated RF controller, said transponder including a FSK detector circuit for detecting read and write commands from said controller, and a control logic circuit responsive to said read and write commands, said transponder comprising:

a ferroelectric memory array responsive to said detector circuit and said control logic circuit for storing data written to said transponder by said controller; and a PSK modulator circuit responsive to said control logic circuit, said modulator circuit for continuously transmitting configuration data to said controller when said read or write commands are not detected by said detector circuit.

9. The RF transponder of claim 8 wherein said RF transponder further comprises:

a power supply coupled to said detector circuit for deriving a power source for said transponder from an RF signal transmitted by said controller.

10. The RF transponder of claim 8 wherein a portion of said configuration data is contained within said data stored in said ferroelectric memory array.

11. The RF transponder of claim 8 wherein said transponder comprises an integrated circuit.

12. The RF transponder of claim 11 wherein a portion of said configuration data is fixed during processing of said integrated circuit.

13. The RF transponder of claim 11 wherein said transponder is substantially 85.7 mm by 54.0 mm by 0.76 mm.

14. The RF transponder of claim 8 wherein said data received from said controller is received at substantially 120 KHz.

15. The RF transponder of claim 14 wherein said data received from said controller is FSK modulated between substantially 125 KHz and 116.3 KHz.

16. The RF transponder of claim 8 wherein said data transmitted to said controller is transmitted at substantially 62.5 KHz.

17. The RF transponder of claim 16 wherein said data transmitted to said controller is PSK modulated.

18. The RF transponder of claim 8 wherein said data stored in said ferroelectric memory array is transmitted to said controller instead of said configuration data in response to a read command from said controller.

19. The RF transponder of claim 8 wherein said data stored in said ferroelectric memory array is changed in response to a write command from said controller.

20. The RF transponder of claim 8 wherein said data received from said controller and transmitted to said controller from said transponder is half duplex in operation.

21. The RF transponder of claim 8 wherein said data received from said controller and transmitted to said controller from said transponder is full duplex in operation.

22. An RF transponder having an antenna for receiving a FSK modulated RF signal from, and for transmitting a PSK modulated RF signal to, an associated RF controller, said transponder including a FSK detector circuit coupled to said antenna for detecting FSK modulated data and read and write commands transmitted from said controller, and said transponder including a control logic circuit coupled to said antenna and responsive to said data and read and write commands, said transponder comprising:

a ferroelectric memory array coupled to said FSK detector circuit and to said control logic circuit, and responsive to said FSK detector circuit and to said control logic circuit for storing said data transmitted from said controller;

said ferroelectric memory array being selectively addressable in response to said control logic circuit;

said ferroelectric memory array being selectively addressable in response to an address block transmitted from said controller to said transponder in conjunction with said read and write commands;

said address block and read and write commands specifying a single word within said ferroelectric memory array;

a data encoder circuit coupled to said ferroelectric memory array for encoding data read from said ferroelectric memory array; and a PSK modulator circuit coupled to said data encoder circuit and to said antenna for PSK modulating an RF signal in accordance with said encoded data to produce said PSK modulated RF signal.

23. The RF transponder of claim 22 wherein said address block and read and write commands specify a starting word address within said memory array.

24. The RF transponder of claim 23 wherein said address block and read and write commands specify an ending word address within said memory array.

25. The RF transponder of claim 22 wherein said RF transponder further comprises:

a power supply coupled to said detector circuit for deriving a power source for said transponder from an RF signal transmitted from said controller.

26. The RF transponder of claim 22 wherein said transponder comprises an integrated circuit.

27. The RF transponder of claim 22 wherein said transponder is substantially 85.7 mm by 54.0 mm by 0.76 mm.

28. The RF transponder of claim 22 wherein said data transmitted from said controller is transmitted at substantially 120 KHz.

29. The RF transponder of claim 28 wherein said data transmitted from said controller is FSK modulated between substantially 125 KHz and 116.3 KHz.

30. The RF transponder of claim 22 wherein said data transmitted to said controller is transmitted at substantially 62.5 KHz.

31. The RF transponder of claim 22 wherein said data stored in said ferroelectric memory array is changed in response to a write command from said controller.

32. The RF transponder of claim 31 wherein said data stored in said ferroelectric memory array is changed by complementing selected bits thereof.

33. The RF transponder of claim 22 wherein said data transmitted from said controller and transmitted to said controller from said transponder is half duplex in operation.

34. The RF transponder of claim 22 wherein said data transmitted from said controller and transmitted to said controller from said transponder is full duplex in operation.

35. A method for operating an RF transponder in conjunction with an associated RF controller comprising the steps of:

continuously transmitting configuration information from said RF transponder to said RF controller;

detecting a read command at said RF transponder that is transmitted from said RF controller;

reading out data from one or more selected memory locations at said RF transponder in response to said read command;

transmitting said data from said RF transponder to said RF controller;

detecting a write command at said RF transponder that is transmitted from said RF controller in synchronization with said step of reading out data; and writing data to said one or more selected memory locations in accordance with said write command, wherein said step of writing data comprises the steps of receiving a write pulse at said RF transponder coincident with a data bit at said one or more selected memory locations, complementing said data bit, and storing said complemented data bit at each of said one or more selected memory locations.

36. The method of claim 35 wherein said steps of reading and writing are half duplex.

37. The method of claim 35 wherein said steps of reading and writing are full duplex.

38. The method of claim 36 further comprising the steps of:

re-reading out data from said one or more selected memory locations in response to an additional one of said read commands; and verifying that said data bit has been complemented at each of said one or more selected memory locations.

39. The method of claim 37 further comprising the steps of:

re-reading out data from said one or more selected memory locations in response to an additional one of said read commands; and verifying that said data bit has been complemented at each of said one or more selected memory locations within a single bit time.

40. The method of claim 35 wherein said steps of continuously transmitting and transmitting are carried out by means of a PSK modulated signal.

41. The method of claim 40 wherein said PSK modulated signal has a frequency of substantially 62.5 KHz.

42. The method of claim 35 further comprising the steps of:

placing said RF transponder within a predetermined radius of said RF controller;

receiving an RF signal from said RF controller; and deriving a power source from said RF transponder from said RF signal.

43. The method of claim 35 wherein said step of continuously transmitting is carried out by repeatedly transmitting a configuration word indicative of a particular one of a plurality of RF transponders.

44. The method of claim 43 wherein said configuration word comprises 16 bits.

45. The method of claim 43 wherein said configuration word includes a synchronization block of bits.

46. The method of claim 43 wherein said configuration word includes one or more bits indicative of a lock status of particular ones of said one or more selected memory locations.

47. The method of claim 35 wherein said step of detecting is carried out by an FSK detector.

48. The method of claim 35 wherein said step of reading out data comprises the steps of:

determining an initial transponder memory address from said detected read command;

establishing a final transponder memory address from said detected read command; and incrementing from said initial to said final transponder memory addresses.

49. The method of claim 48 wherein said step of determining is carried out by a control logic circuit.

50. The method of claim 49 wherein said control logic circuit comprises a finite state machine.

51. The method of claim 49 wherein said steps of establishing and incrementing are carried out by said control logic circuit and an associated address register.

52. The method of claim 35 wherein said step of transmitting is carried out by the steps of:

placing said data in a data register;

encoding said data; and modulating an RF signal with said encoded data.

53. The method of claim 52 wherein said step of encoding is carried out by Manchester encoding.

54. The method of claim 52 wherein said step of modulating is carried out by PSK modulation.

55. An RF transponder for receiving data from, and transmitting data to, an RF controller, said transponder including a memory array for storing transponder data, a number of associated subsystems including a detector circuit for detecting controller data transmitted from said RF controller, a modulator circuit for transmitting transponder data from said RF transponder to said RF controller, and a control logic circuit responsive to said controller data transmitted from said RF controller for controlling transponder functions, said transponder comprising:

a power supply operatively coupled to said memory array and said associated subsystems for deriving a source of power from a first RF signal transmitted from said RF controller, said power supply furnishing a first voltage output signal when a sufficient power level is derived from said first RF signal to power said associated subsystems but not said memory array, and furnishing a second voltage output signal when a sufficient power level is derived from said first RF signal to power said associated subsystems and said memory array, whereby said RF transponder transmits an unmodulated second RF signal to said RF controller when said power supply furnishes said first voltage output signal, and said RF transponder transmits a modulated second RF signal to said RF controller when said power supply furnishes said second voltage output signal.

56. The RF transponder of claim 55 wherein said memory array is a non-volatile memory array.

57. The RF transponder of claim 56 wherein said non-volatile memory array is a ferroelectric memory array.

58. The RF transponder of claim 57 wherein said ferroelectric memory array comprises a PZT memory array.

59. The RF transponder of claim 55 wherein said modulated second RF signal is a transponder configuration word.

60. The RF transponder of claim 59 wherein said modulated second RF signal is at least partially modulated with said transponder data.

61. The RF transponder of claim 59 wherein said configuration word comprises a synchronization block.

62. The RF transponder of claim 59 wherein said configuration word includes a number of lock bits indicative of selected locations within said memory array locked to further writes by said controller.

63. The RF transponder of claim 59 wherein said configuration word includes a number of mask bits set during fabrication of said RF transponder.

64. The RF transponder of claim 59 wherein said configuration word includes a number of type bits to identify said RF transponder to said controller.

65. The RF transponder of claim 55 wherein said modulated second RF signal is PSK modulated.

66. The RF transponder of claim 55 wherein said modulated and unmodulated RF signals are substantially 62.5 KHz.

67. The RF transponder of claim 55 wherein said first RF signal is substantially 120 KHz.

68. The RF transponder of claim 67 wherein said first RF signal is FSK modulated between substantially 125 KHz to 116.3 KHz.

69. The RF transponder of claim 55 wherein said controller data comprises a command word.

70. The RF transponder of claim 69 wherein said command word comprises a synchronization block.

71. The RF transponder of claim 69 wherein said command word comprises a number of address bits for accessing selected locations in said memory array.

72. The RF transponder of claim 71 wherein said command word further comprises a number of command bits for controlling said control logic circuit.

73. The RF transponder of claim 55 wherein said controller data comprises a number of complement bits for altering data in said RF transponder memory array in response thereto.

* * * * *